(12) United States Patent
Kunardi et al.

(10) Patent No.: US 12,470,233 B2
(45) Date of Patent: Nov. 11, 2025

(54) MULTIBAND MULTIPLEXER FOR CARRIER AGGREGATION

(71) Applicant: RF360 SINGAPORE PTE. LTD., Republic Plaza (SG)

(72) Inventors: Bambang Kunardi, Singapore (SG); Soon Ying Teoh, Singapore (SG); Poh Sen Lim, Singapore (SG); Guan Qiong Cui, Singapore (SG); Joerg Hornsteiner, Mittenwald (DE); Philippe Cortese, Glasgow (GB); Felipe De Los Rios, Munich (DE); Sean Chun-Hsiang Yang, San Diego, CA (US)

(73) Assignee: RF360 Singapore Pte. Ltd., Republic Plaza (SG)

( * ) Notice: Subject to any disclaimer, the term of this patent is extended or adjusted under 35 U.S.C. 154(b) by 563 days.

(21) Appl. No.: 17/820,494

(22) Filed: Aug. 17, 2022

(65) Prior Publication Data

US 2023/0059854 A1 Feb. 23, 2023

Related U.S. Application Data

(60) Provisional application No. 63/236,010, filed on Aug. 23, 2021.

(51) Int. Cl.
*H04W 4/00* (2018.01)
*H04B 1/00* (2006.01)
*H04W 72/0453* (2023.01)

(52) U.S. Cl.
CPC ...... *H04B 1/0057* (2013.01); *H04W 72/0453* (2013.01)

(58) Field of Classification Search
CPC .................. H04B 1/0057; H04W 72/0453
See application file for complete search history.

(56) References Cited

U.S. PATENT DOCUMENTS

| | | | |
|---|---|---|---|
| 9,929,769 B1 | 3/2018 | Guyette et al. | |
| 2014/0133364 A1 | 5/2014 | Weissman et al. | |
| 2016/0294031 A1 | 10/2016 | Cheng et al. | |
| 2018/0159583 A1* | 6/2018 | Kang | H03H 7/465 |
| 2018/0226946 A1* | 8/2018 | Kim | H04B 1/0057 |
| 2019/0123720 A1* | 4/2019 | Takamine | H04B 1/0057 |
| 2020/0036401 A1* | 1/2020 | Ella | H04B 1/525 |

OTHER PUBLICATIONS

International Search Report and Written Opinion—PCT/EP2022/073100—ISA/EPO—Jul. 12, 2022.

* cited by examiner

*Primary Examiner* — Omoniyi Obayanju
(74) *Attorney, Agent, or Firm* — Polsinelli

(57) ABSTRACT

Aspects are provided for multiband multiplexers. One example is a multiband multiplexer with a first filter element configured to have a first passband that spans a first predefined frequency range of a first communication band and a second predefined frequency range of a second communication band, wherein the first predefined frequency range overlaps a portion of the second predefined frequency range, a second filter element configured to have a second passband distinct from the first passband, a third filter element configured to have a third passband distinct from the first and second passbands, and a fourth filter element configured to have a fourth passband distinct from the first, second, and third passbands.

28 Claims, 19 Drawing Sheets

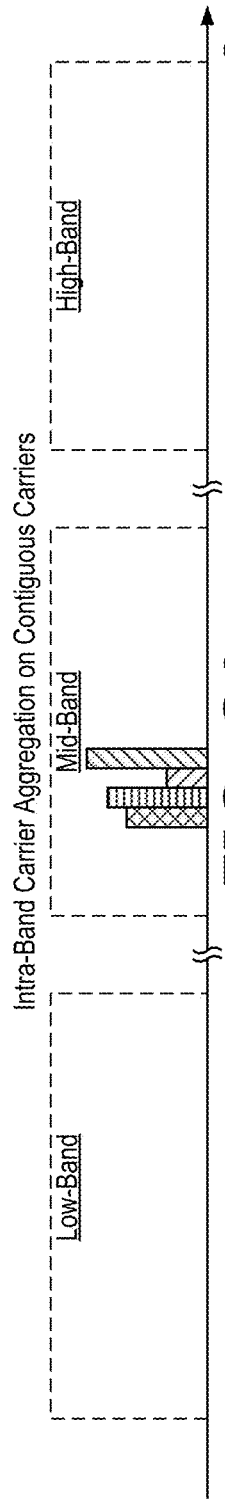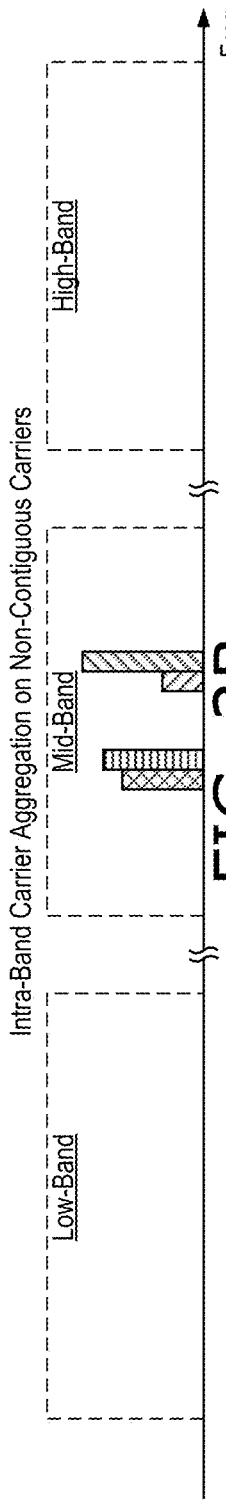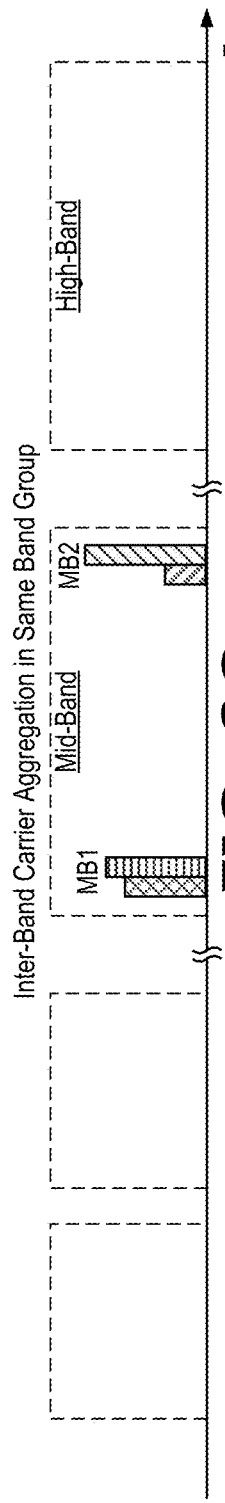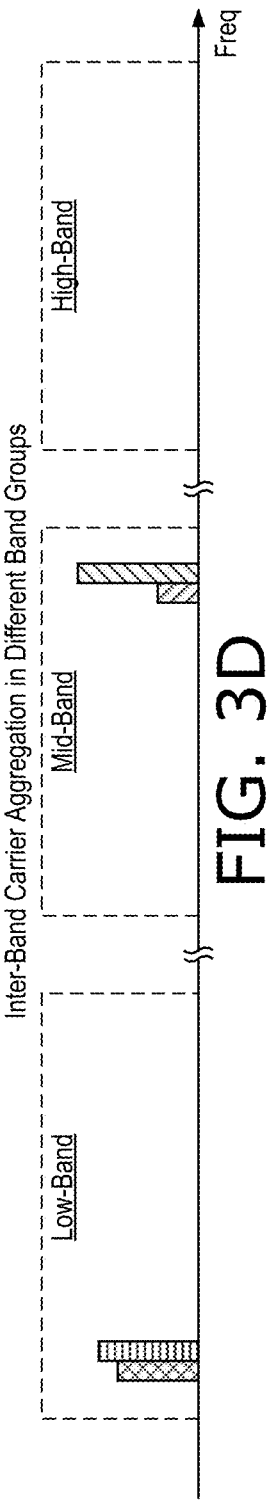

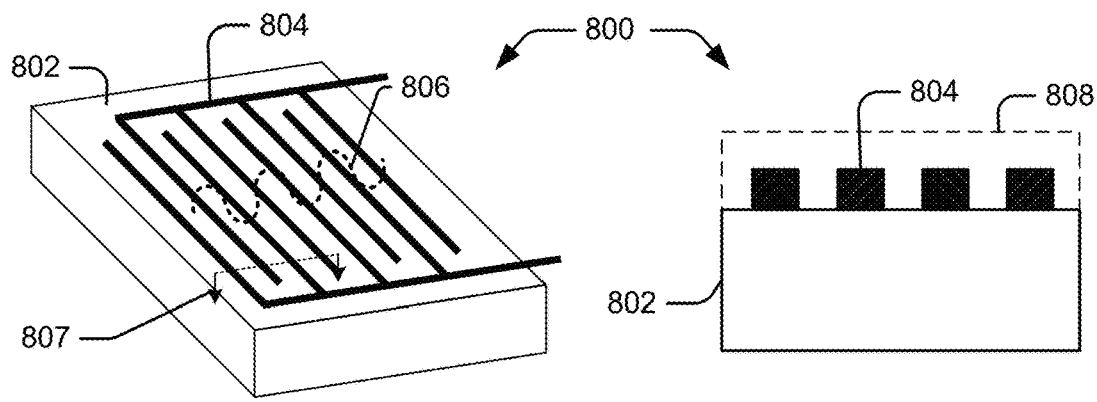
FIG. 8A
FIG. 8B
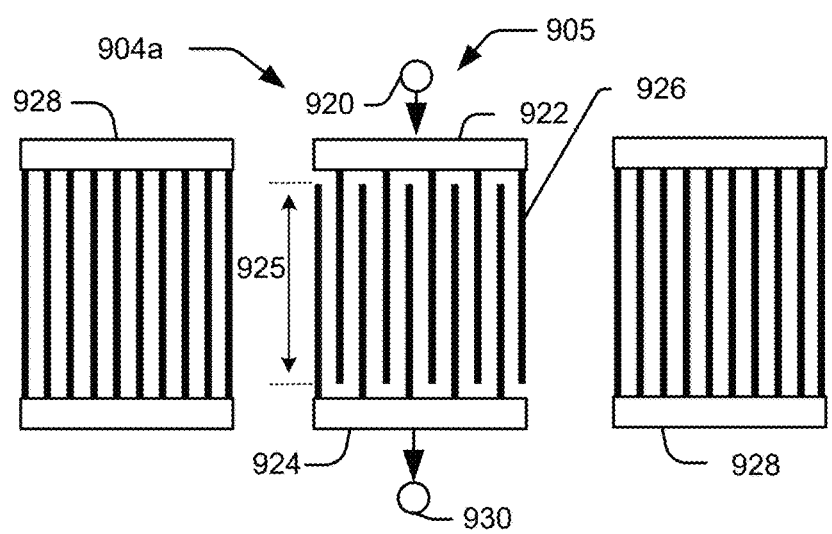
FIG. 9A
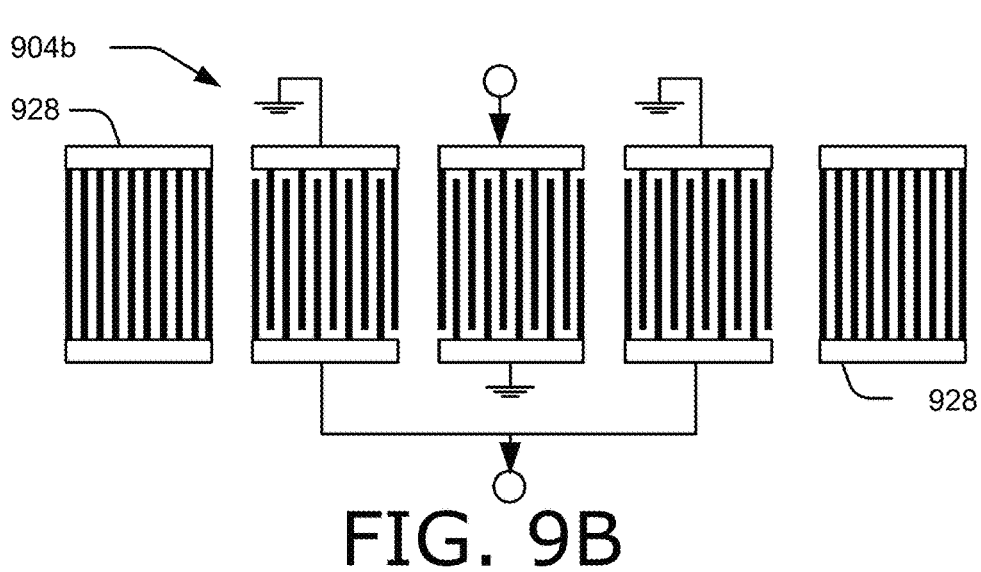
FIG. 9B

MULTIBAND MULTIPLEXER FOR CARRIER AGGREGATION

CROSS-REFERENCES TO RELATED APPLICATIONS

This application claims the benefit of U.S. Provisional Application No. 63/236,010, filed Aug. 23, 2021, titled "MULTIBAND MULTIPLEXER FOR CARRIER AGGREGATION," which is hereby incorporated by reference, in entirety and for all purposes.

FIELD

The present disclosure relates generally to wireless communications and more particularly to filter configurations having a multiband multiplexer for use with carrier aggregation.

BACKGROUND

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to obtain a modulated RF signal, amplify the modulated RF signal to obtain an amplified RF signal having the proper output power level, and transmit the amplified RF signal via an antenna to a base station. For data reception, the receiver may obtain a received RF signal via the antenna and may amplify and process the received RF signal to recover data sent by the base station.

A wireless device may support carrier aggregation, which is simultaneous operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. It is desirable to efficiently support carrier aggregation by the wireless device.

SUMMARY

Aspects described herein include methods, systems, devices, instructions, and other implementations for filtering using a multiband multiplexer for carrier aggregation in wireless communications.

One aspect includes a method for filtering a plurality of signals for wireless communications. The method includes receiving, at a carrier aggregation (CA) port, the plurality of signals; and filtering, via a quadplexer, the plurality of signals transmitted and received over: a first communication band defined by a first transmission frequency range and a first reception frequency range; a second communication band defined by a second transmission frequency range and a second reception frequency range; a third communication band defined by a third transmission frequency range and a third reception frequency range; a fourth communication band defined by a fourth transmission frequency range and a fourth reception frequency range; a fifth communication band defined by a fifth transmission frequency range and a fifth reception frequency range; and a sixth communication band defined by a sixth transmission frequency range and a sixth reception frequency range; where frequency ranges for each of the first, second, third, fourth, fifth, and sixth communication bands are distinct, and overlap at least a portion of a frequency range for another of the first, second, third, fourth, fifth, and sixth communication bands.

Another aspect includes an apparatus for filtering one or more signals for wireless communications. The apparatus includes a plurality of filter circuits configured to filter the one or more signals transmitted and received over at least one of: a first communication band defined by a first transmission frequency range and a first reception frequency range; a second communication band defined by a second transmission frequency range and a second reception frequency range; a third communication band defined by a third transmission frequency range and a third reception frequency range; and a fourth communication band defined by a fourth transmission frequency range and a fourth reception frequency range, the plurality of filter circuits comprising: a first filter element configured to have a first passband that spans both the first transmission frequency range and the second transmission frequency range, the second transmission frequency range partially overlapping or adjacent to the first transmission frequency range; a second filter element having a second passband that spans the third transmission frequency range; a third filter element having a third passband that spans both the second reception frequency range and the third reception frequency range; and a fourth filter element having a fourth passband that spans the fourth reception frequency range.

Another aspect includes a multiplexer comprising at least four filters. The multiplexer includes a first filter having a first passband extending from 1710 MHz to 1785 MHz; a second filter having a second passband extending from 1800 MHz to 1880 MHz; a third filter having a third passband extending from 1920 MHz to 2020 MHz; and a fourth filter having a fourth passband extending from 2110 MHz to 2200 MHz, each filter coupled to a common port, the common port coupled between an antenna and the at least four filters.

Another aspect includes an apparatus for filtering one or more signals for wireless communications. The apparatus includes a multiband multiplexer that includes a first filter element, a second filter element, a third filter element, and a fourth filter element:

where the first filter element configured to have a first passband that spans a first predefined frequency range of a first communication band and a second predefined frequency range of a second communication band, where the first predefined frequency range overlaps a portion of the second predefined frequency range; where the second filter element configured to have a second passband distinct from the first passband; where the third filter element configured to have a third passband distinct from the first and second passbands; where the fourth filter element configured to have a fourth passband distinct from the first, second, and third passbands; and where the first filter element, the second filter element, the third filter element, and the fourth filter element share a common port.

Some such aspects operate where the multiplexer is a quadplexer that is configured to filter signals transmitted and received over: the first communication band defined by a first transmission frequency range and a first reception frequency range; the second communication band defined by a second transmission frequency range and a second reception frequency range; a third communication band defined by a third transmission frequency range and a third reception frequency range; a fourth communication band defined by a fourth transmission frequency range and a fourth reception frequency range; a fifth communication band defined by a fifth transmission frequency range and a fifth reception frequency range; and a sixth communication band defined by a sixth transmission frequency range and a sixth reception frequency range; where frequency ranges for each of the first, second, third, fourth, fifth, and sixth communication bands are distinct, and overlap at least a portion of a frequency range for another of the first, second, third, fourth, fifth, and sixth communication bands within the first passband, the second passband, the third passband, and the fourth passband.

Some such aspects operate where the first communication band corresponds to long term evolution (LTE) defined band 1; where the second communication band corresponds to LTE defined band 3; where the third communication band corresponds to LTE defined band 4; where the fourth communication band corresponds to LTE defined band 23; where the fifth communication band corresponds to LTE defined band 65; and where the sixth communication band corresponds to LTE defined band 66.

Some such aspects operate where the first transmission frequency range includes frequencies between 1920 megahertz (MHz) and 1980 MHz.

Some such aspects operate where the second transmission frequency range includes frequencies between 1710 MHz and 1785 MHz.

Some such aspects operate where the second reception frequency range includes frequencies between 1805 MHz and 1880 MHz; where the third transmission frequency range includes frequencies between 1710 MHz and 1755 MHz.

Some such aspects operate where the third transmission frequency range is higher in frequency than the first transmission frequency range and the second transmission frequency range.

Some such aspects operate where the second reception frequency range is higher in frequency than the first reception frequency range and the third reception frequency range.

Some such aspects operate where the first filter element, the second filter element, the third filter element, and the fourth filter element form a portion of a quadplexer.

Some such aspects operate where the first passband is substantially adjacent to the second passband, with a narrow stopband between the first passband and the second passband.

Some such aspects operate where the third passband is substantially adjacent to the second passband, with a narrow stopband between the third passband and the second passband.

Some such aspects operate where the third passband is substantially adjacent to the fourth passband, with a narrow stopband between the third passband and the fourth passband.

Some such aspects operate where the quadplexer comprises one or more phase shifting components electrically connected to at least one of the first filter element, the second filter element, the third filter element, the fourth filter element, or any combination thereof.

Some such aspects operate where the one or more phase shifting components are electrically connected between a common port and at least one of the first filter element, the second filter element, the third filter element, or the fourth filter element.

Some such aspects operate where the first filter element, the second filter element, the third filter element, and the fourth filter element form a plurality of filter circuits, the apparatus further comprising a power amplifier and a connection port configured to electrically connect to an antenna, where at least one of the plurality of filter circuits is selectively electrically connected between the power amplifier and the connection port.

Some such aspects operate where the first filter element, the second filter element, the third filter element, and the fourth filter element form a plurality of filter circuits, the apparatus further comprising one or more electronic switching components having at least one switching component electrically connected between the plurality of filter circuits and an antenna connection port configured to electrically connect to an antenna.

Some such aspects operate where the first filter element, the second filter element, the third filter element, and the fourth filter element form a plurality of filter circuits, the apparatus further comprising a transceiver circuit comprising the plurality of filter circuits.

Some such aspects operate where the transceiver circuit is configured to operate in a first carrier aggregation mode to transmit and receive the one or more signals over a combination of the first communication band and the second communication band in a frequency division duplexing mode.

Some such aspects operate where the transceiver circuit is further configured to operate in a second carrier aggregation mode to transmit and receive the one or more signals over a combination of the second communication band and the third communication band.

Some such aspects operate where the first filter element, the second filter element, the third filter element, and the fourth filter element form a plurality of filter circuits, the apparatus further comprising one or more other filter circuits and a plurality of switching components, the plurality of switching components electrically connected between a node and both the plurality of filter circuits and the one or more other filter circuits.

Some such aspects operate where the first filter element, the second filter element, the third filter element, and the fourth filter element form a plurality of filter circuits, where the plurality of filter circuits comprises one or more acoustic wave resonators.

In some aspects, the described multiplexer is integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

FIGS. 3A, 3B, 3C, and 3D are diagrams illustrating four examples of carrier aggregation types according to aspects of the present disclosure.

FIG. 8A is a diagram of a perspective view of an example of an electroacoustic device for use with some examples described herein.

FIG. 8B is a diagram of a side view of the electroacoustic device of FIG. 8A.

FIG. 9A is a diagram of a top view of an example of an electrode structure of an electroacoustic device for use with some examples described herein.

FIG. 9B is a diagram of a top view of another example of an electrode structure of an electroacoustic device for use with some examples described herein.

DETAILED DESCRIPTION

Figure 1:
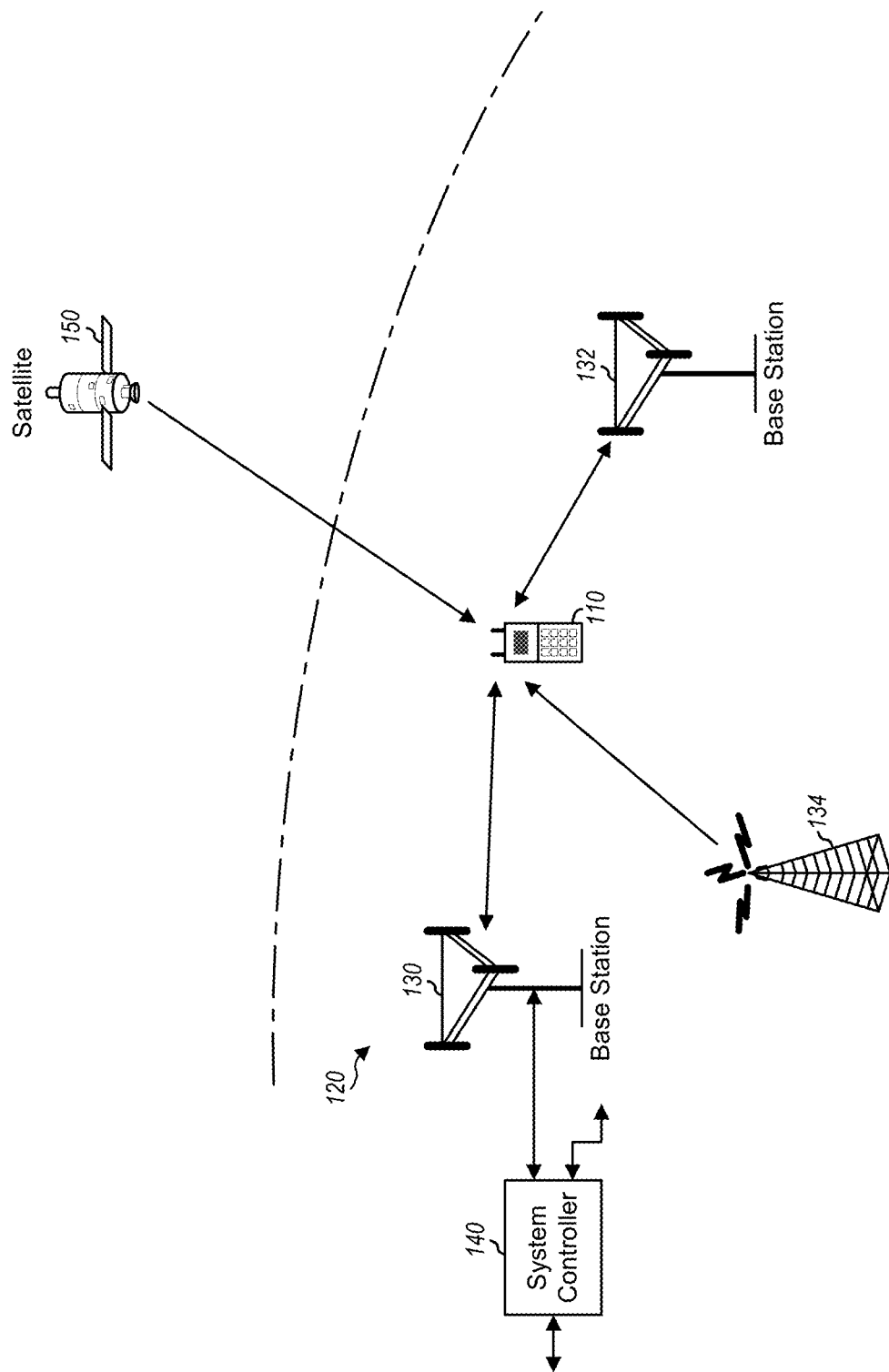
FIG. 1 is a diagram of wireless device communication in a wireless system according to an aspect of the present disclosure.

The detailed description set forth below in connection with the appended drawings is intended as a description of various aspects of implementations and is not intended to represent the only implementations in which the invention may be practiced. The detailed description includes specific details for the purpose of providing a thorough understanding of the described aspects. In some instances, some devices are shown in block diagram form. Drawing elements that are common among the following figures may be identified using the same reference numerals.

As noted, a wireless device may support carrier aggregation. In general, carrier aggregation involves simultaneous operation on multiple carriers. Filtering requirements when implementing carrier aggregation increase as the number of combinations of bands a device is required to support simultaneously increases. For example, when multiple bands are being used amongst different modes (e.g., different pairs of bands), the matching and loading of different connected filter impacts device performance. For interband carrier aggregation, if the bands are close to each other in frequency, the complexity of the filtering requirements increases.

Quadplexers are typically used to support two frequency division duplex communication bands as part of carrier aggregation support. In such operation, support for six communication bands would use four filter components (e.g., where each filter component may include multiple filters). Aspects described herein relate to a quadplexer with quadplexer passbands extended to cover additional communication bands leveraging improved acoustoelectric resonators (e.g., surface acoustic wave resonators (SAWs) or bulk acoustic wave resonators (BAWs)) to provide sufficient filter performance to integrate the filters into a single component. Using such filter components, the number of filter components in a device can be reduced and device performance can be improved.

Aspects of the disclosure are related to a filter circuit including a multiband multiplexer in a configuration that allows for supporting multiple different bands (e.g., six different bands or other number of bands) while simplifying aspects the filter configuration structure with a single component. For example, illustrative aspects of the present disclosure include a single quadplexer filter configuration that supports different bands (e.g., six different bands) having overlapping frequency ranges. The multiband multiplexer configuration described herein improve device performance by simplifying the device structure, such as by using a single component in place of multiple components to cover filtering of the frequency bands (e.g., the six frequency bands) that would be present in previous devices performing such filtering. Corresponding implementations for the multiband multiplexer configuration described herein reduce overall device component cost, avoid duplicate filtering, and reduce calibration requirements for transmit paths, among other improvements.

In some aspects, radio frequency (RF) architecture can be simplified by configuring the single component multiband multiplexer to use a combination of certain frequency bands defined by different cellular communication standards (e.g., third generation partnership project (3GPP) frequency bands, such as 3G/4G/5G frequency bands). In some cases, configuring the single component multiband multiplexer to use such a combination of frequency bands can reduce the number of switches used to connect bands to power amplifiers and low noise amplifiers. Additionally or alternatively, in some cases, configuring the single component multiband multiplexer to use such a combination of frequency bands can simplify routing between various components through use of a single filtering component in place of multiple filtering components in previous systems. Such simplification can result in improved RF performance, as well as lower device complexity, smaller space usage, and corresponding reductions in device cost and/or size.

In one aspect, a single filter component for band 1, band 3, band 4, band 23, band 65, and band 66 is used in place of individual components for each single or dual-band combination. In some aspects, the filter circuits that make up the single filter component include a first filter element configured to have a first passband that spans adjacent transmission frequency ranges of a first communication band (e.g., band 4 with a transmission (Tx) frequency range from 1710 MHz to 1755 MHz) and a second overlapping transmission band (e.g., band 66 with a Tx frequency range from 1710 MHz to 1780 MHz). The plurality of filter circuits further includes a second filter element having a second passband that spans a frequency range of a third communication band (e.g., band 65 with a receive (Rx) frequency range of 2110 MHz to 2200 MHz) and a fourth communication band (e.g., band 23 with an Rx frequency range of 2180 MHz to 2200 MHz) that overlaps partially with the third communication band. In some aspects, the communication bands supported by a multiband multiplexer each overlap with at least a portion of communication bands from another band supported by the multiband multiplexer (e.g., overlap between band 3 transmission frequencies and band 66 transmission frequencies, and overlap between band 66 receive frequencies and band 23 receive frequencies). Additional illustrative examples of filter passband groupings of overlapping communication bands are shown in FIGS. 4A-4H.

Further details regarding the aspects provided herein are described with respect to the figures.

FIG. 1 shows a wireless device 110 communicating with a wireless communication system 120. The wireless communication system 120 may be a long term evolution (LTE) system, a 5th generation wireless system (5G), a code division multiple access (CDMA) system, a global system for mobile communications (GSM) system, a wireless local area network (WLAN) system, or some other wireless system, or combination thereof. A CDMA system may implement wideband CDMA (WCDMA), time division synchronous CDMA (TD-SCDMA), CDMA2000, or some other version of CDMA. For simplicity, FIG. 1 shows the wireless communication system 120 including two base stations 130 and 132 and one system controller 140. In general, a wireless system may include any number of base stations and any number of network entities. As described herein, LTE systems utilize numbered communication bands, such as bands 1, 3, 4, 23, 65, and 66 with associated frequency ranges that are used for communications as described herein.

The wireless device 110 may also be referred to as a user equipment (UE), a mobile station, a terminal, an access terminal, a subscriber unit, a station, etc. The wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, and the like. The wireless device 110 may be capable of communicating with the wireless communication system 120. The wireless device 110 may also be capable of receiving signals from broadcast stations (e.g., a broadcast station 134), signals from satellites (e.g., a satellite 150) in one or more global navigation satellite systems (GNSS), etc. The wireless device 110 may support one or more radio technologies for wireless communication such as LTE, CDMA2000, WCDMA, TD-SCDMA, GSM, 802.11, etc.

The wireless device 110 may support carrier aggregation, which is operation on multiple carriers. Carrier aggregation may also be referred to as multi-carrier operation. According to an aspect of the present disclosure, the wireless device 110 may be able to operate in low-band from 698 to 960 megahertz (MHz), mid-band from 1475 to 2170 MHz, and/or high-band from 2300 to 2690, ultra-high band from 3400 to 3800 MHz, and long-term evolution (LTE) in LTE unlicensed bands (LTE-U/LAA) from 5150 MHz to 5950 MHz. Low-band, mid-band, high-band, ultra-high band, and LTE-U refer to five groups of bands (or band groups—e.g., within a certain frequency range), with each band group including a number of frequency bands (or simply, "bands"). For example, in some systems each band may cover up to 200 MHz and may include one or more carriers. For example, each carrier may cover up to 40 MHz in LTE. In other aspects, other frequency ranges may be used. Examples of LTE/UMTS bands are listed in 3GPP TS 36.101. The wireless device 110 may be configured with multiple carriers in several bands (e.g., see LTE Release 15).

In general, carrier aggregation (CA) may be categorized into two types: intra-band CA and inter-band CA. Intra-band CA refers to operation on multiple carriers within the same band and inter-band CA refers to operation on multiple carriers in different bands.

Figure 2:
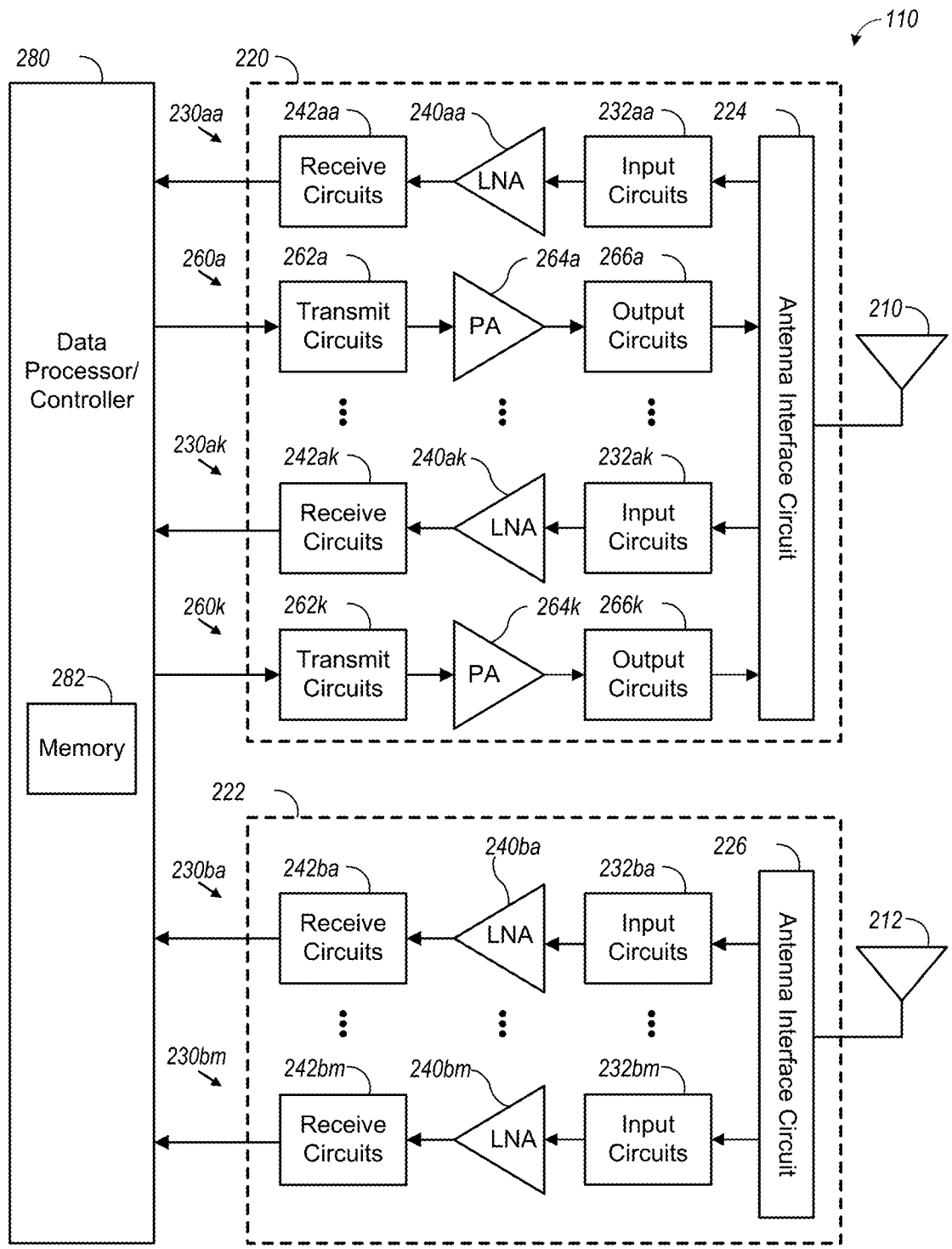
FIG. 2 is a functional block diagram of the wireless device of FIG. 1 according to an aspect of the present disclosure.

FIG. 2 is a functional block diagram of the wireless device 110 of FIG. 1 according to an aspect of the present disclosure. In some aspects, the wireless device 110 includes a transceiver 220 coupled to a primary antenna 210, receivers 222 coupled to a secondary antenna 212, and a data processor/controller 280. The transceiver 220 includes multiple (K) receivers 230aa to 230ak and multiple (K) transmitters 260a to 260k to support multiple bands, carrier aggregation, multiple radio technologies, etc. The receivers 222 include multiple (M) receivers 230ba to 230bm to support multiple bands, carrier aggregation, multiple radio technologies, receive diversity, MIMO transmission from multiple transmit antennas to multiple receive antennas, etc.

In the aspects illustrated by FIG. 2, each receiver 230 includes input circuits 232, a low-noise amplifier (LNA) 240, and receive circuits 242. For data reception, the antenna 210 receives signals from base stations and/or other transmitter stations and provides a received RF signal, which is routed through an antenna interface circuit 224 and provided to a selected receiver. The antenna interface circuit 224 may include switches, duplexers, transmit filters, receive filters, etc. The description below assumes that the receiver 230aa is the selected receiver. Within the receiver 230aa, the received RF signal is passed through input circuits 232aa, which provides an input RF signal to an LNA 240aa. Input circuits 232aa may include a matching circuit, a receive filter, etc. The LNA 240aa amplifies the input RF signal and provides an output RF signal. Receive circuits 242aa amplify, filter, and down convert the output RF signal from RF to baseband and provide an analog input signal to data processor 280. Receive circuits 242 may include mixers, filters, amplifiers, matching circuits, an oscillator, a local oscillator (LO) generator, a phase locked loop (PLL), etc. Each remaining receiver 230 in the transceiver 220 and each receiver 230 in the receivers 222 may operate in a similar manner as the receiver 230aa in the transceiver 220.

In the aspects illustrated in FIG. 2, each transmitter 260 includes a transmit circuit (transmit circuit 262a through 262k), a power amplifier (PA) (a PA 264a through 264k), and an output circuit (output circuits 266a through 266k). For data transmission, a data processor 280 processes (e.g., encodes and modulates) data to be transmitted and provides an analog output signal to a selected transmitter. The description below assumes that the transmitter 260a is the selected transmitter. Within the transmitter 260a, transmit circuits 262a amplify, filter, and upconvert the analog output signal from baseband to RF and provide a modulated RF signal. Transmit circuits 262a may include amplifiers, filters, mixers, matching circuits, an oscillator, an LO generator, a PLL, etc. A PA 264a receives and amplifies the modulated RF signal and provides a transmit RF signal having the proper output power level. The transmit RF signal is passed through output circuits 266a, routed through the antenna interface circuit 224, and transmitted via the antenna 210. Output circuits 266a may include a matching circuit, a transmit filter, a directional coupler, etc.

FIG. 2 shows aspects of a device including receivers 230 and transmitters 260. A receiver and a transmitter may also include other circuits not shown in FIG. 2, such as filters, matching circuits, etc. All or a portion of the transceiver 220 and receivers 222 may be implemented on one or more analog integrated circuits (ICs), RF ICs (RFICs), mixed-signal ICs, etc. For example, LNAs 240, receive circuits 242, and transmit circuits 262a through 262k may be implemented on one module, which may be an RFIC, etc. Antenna interface circuits 224 and 226, input circuits 232, output circuits 266, and PAs 264a through 264k may be implemented on another module, which may be a hybrid module, etc. The circuits in the transceiver 220 and receivers 222 may also be implemented in other manners.

The data processor/controller 280 may perform various functions for the wireless device 110. For example, the data processor 280 may perform processing for data received via the receivers 230 and data transmitted via the transmitters 260. The controller 280 may control the operation of antenna interface circuits 224 and 226, input circuits 232, LNAs 240, receive circuits 242, transmit circuits 262a through 262k, PAs 264a through 264k, output circuits 266, or a combination thereof. A memory 282 may store program codes and data for the data processor/controller 280. The data processor/controller 280 may be implemented on one or more application specific integrated circuits (ASICs) and/or other ICs.

The wireless device 110 may receive transmissions from one or more base stations/cells on multiple carriers at different frequencies for carrier aggregation. For intra-band carrier aggregation (CA), the transmissions are sent on different carriers in the same band. For inter-band CA, the transmissions are sent on multiple carriers in different bands.

FIG. 3A shows an example of contiguous intra-band CA. In the example shown in FIG. 3A, a wireless device (e.g., the wireless device 110) is configured with four contiguous carriers in the same frequency range, which is a band in mid-band frequency range. The wireless device may send and/or receive transmissions on multiple contiguous carriers within the same defined frequency range.

FIG. 3B shows an example of non-contiguous intra-band CA. In the example shown in FIG. 3B, a wireless device (e.g., the wireless device 110) is configured with four non-contiguous carriers in the same frequency range, which is a band in the mid-band frequency range. The carriers may be separated by 5 MHz, 10 MHz, or some other amount. The wireless device may send and/or receive transmissions on multiple non-contiguous carriers within the same frequency range (e.g., mid-band).

FIG. 3C shows an example of inter-band CA in the same frequency range. In the example shown in FIG. 3C, a wireless device (e.g., the wireless device 110) is configured with four carriers in two bands in the same frequency range, which is the mid-band frequency range. The wireless device may send and/or receive transmissions on multiple carriers in different bands in the same frequency range (e.g., Mid-Band 1 (MB1) and Mid-Band 2 (MB2) in FIG. 3C).

FIG. 3D shows an example of inter-band CA in different frequency ranges. In the example shown in FIG. 3D, a wireless device (e.g., the wireless device 110) is configured with four carriers in two bands in different frequency ranges, which include two carriers in one band in the low-band frequency range and two additional carriers in another band in the mid-band frequency range. The wireless device may send and/or receive transmissions on multiple carriers in different bands in different frequency ranges (e.g., low-band frequency ranges and mid-band frequency ranges in FIG. 3D). FIGS. 3A to 3D show four examples of carrier aggregation. Carrier aggregation may also be supported for other combinations of bands. For example, carrier aggregation may be supported for low-band and high-band, mid-band and high-band, high-band and high-band, and other combinations with ultra-high band frequency ranges and long-term evolution in unlicensed spectrum (LTE-U).

Figure 4A:
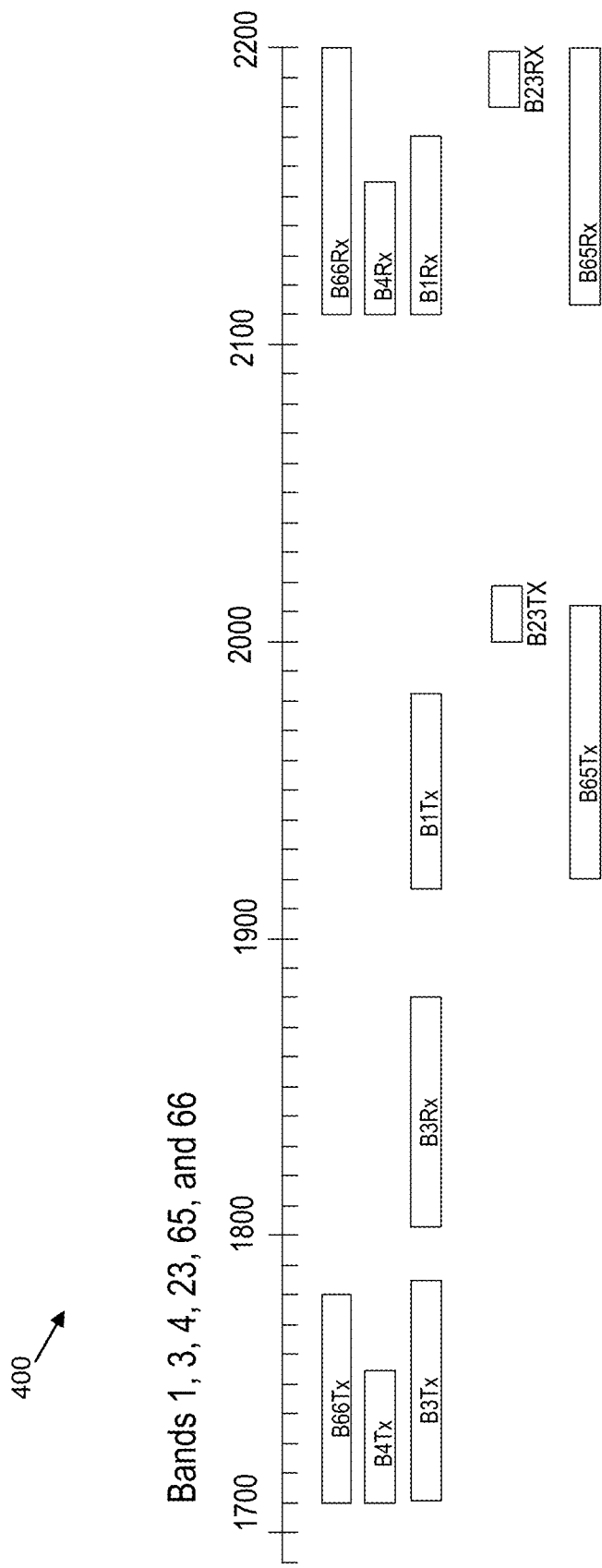
FIG. 4A is a diagram illustrating band combinations for a carrier aggregation scenario according to aspects of the present disclosure.

FIG. 4A is a diagram 400 illustrating band combinations supported by a single RF filter component in accordance with some aspects. Diagram 400 shows approximate frequency ranges for six bands (e.g., 1/3/4/23/65/66) in accordance with 3GPP communication standards. As illustrated, the six different bands each include either a transmission (Tx) or receive (Rx) frequency component that overlaps partially with a frequency component from one of the other six bands. For example, the Tx frequency range for band 3 overlaps with the Tx frequency ranges for bands 66 and 4. Additionally, the illustrated frequency bands can be grouped into four ranges with gaps between the ranges, such that four filter bands for a quadplexer can provide filtering for the various communication band frequency ranges.

For example, different geographic regions support different combinations of carrier aggregation (CA) modes and associated bands. This can present a challenge in managing network handovers and roaming amongst the different geographic regions. For instance, a wireless device that is configured to utilize bands specific to the U.S. and that is roaming into Europe may not support the necessary frequencies nor the correct combination of frequencies for CA. In another example, the U.S. band-specific wireless device may support the necessary European frequency bands but not the correct combinations necessary for CA in Europe. According to aspects described herein, a wireless device can use an individual RF component (e.g., a single RF component) to support the different combinations of bands for different CA modes (e.g., a multiband multiplexer in a configuration that allows for supporting the different combinations of bands). For example, a single RF component (e.g., the multiband multiplexer) of the wireless device that supports different CA modes and associated frequency bands for different geographic regions can be used to operate using a particular CA mode and associated frequency band(s) when the wireless device is located in a given geographic region. In such an example, the wireless device can function in different geographic regions using the single RF component supporting the different CA modes and associated frequency bands, rather than requiring the wireless device to include additional RF elements for supporting different combinations of CA modes and associated bands for different geographic regions.

The diagram 400 of FIG. 4A illustrates inter-band carrier aggregation scenarios where two frequency division duplex (FDD) bands are used simultaneously for reception or transmission or both to increase data rates. The illustrated six communication bands include Tx and Rx frequency ranges as follows: B3 TX 1710-1785 megahertz (MHz); B3 RX 1805-1880 MHz; B1 Tx 1920-1980 MHz; B1 Rx 2110-2170 MHz; B4 Tx 1710-1755 MHz; B4 Rx 2110-2155 MHz; B66 Tx 1710-1780 MHz; B66 Rx 2110-2200 MHz; B23 Tx 2000-2020 MHz; B23 Rx 2180-2200 MHz; B65 Tx 1920-2010 MHz; and B65 Rx 2110-2200 MHz. While a specific group of six frequency bands is described, it will be apparent that other bands can be used in accordance with other aspects, so long as the groupings of the frequency ranges for the different communication bands overlap in a similar fashion to the overlap described above, and include a gap between frequency groupings sufficient to allow filter stopbands between the groups.

Figure 4B:
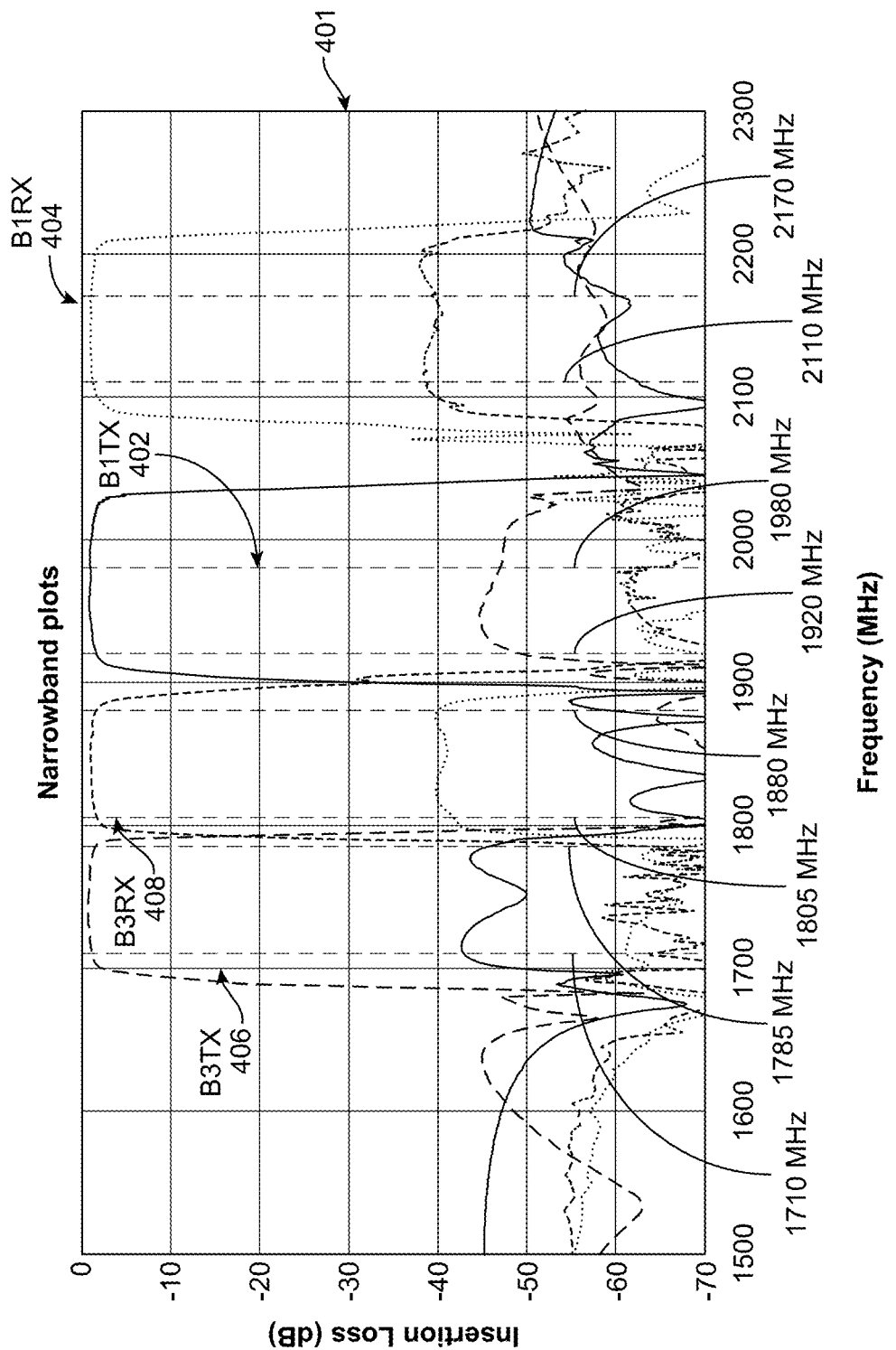
FIG. 4B is a chart of a multiband multiplexer insertion loss frequency response shown with an associated communication band for implementation with carrier aggregation according to aspects of the present disclosure.
Figure 4C:
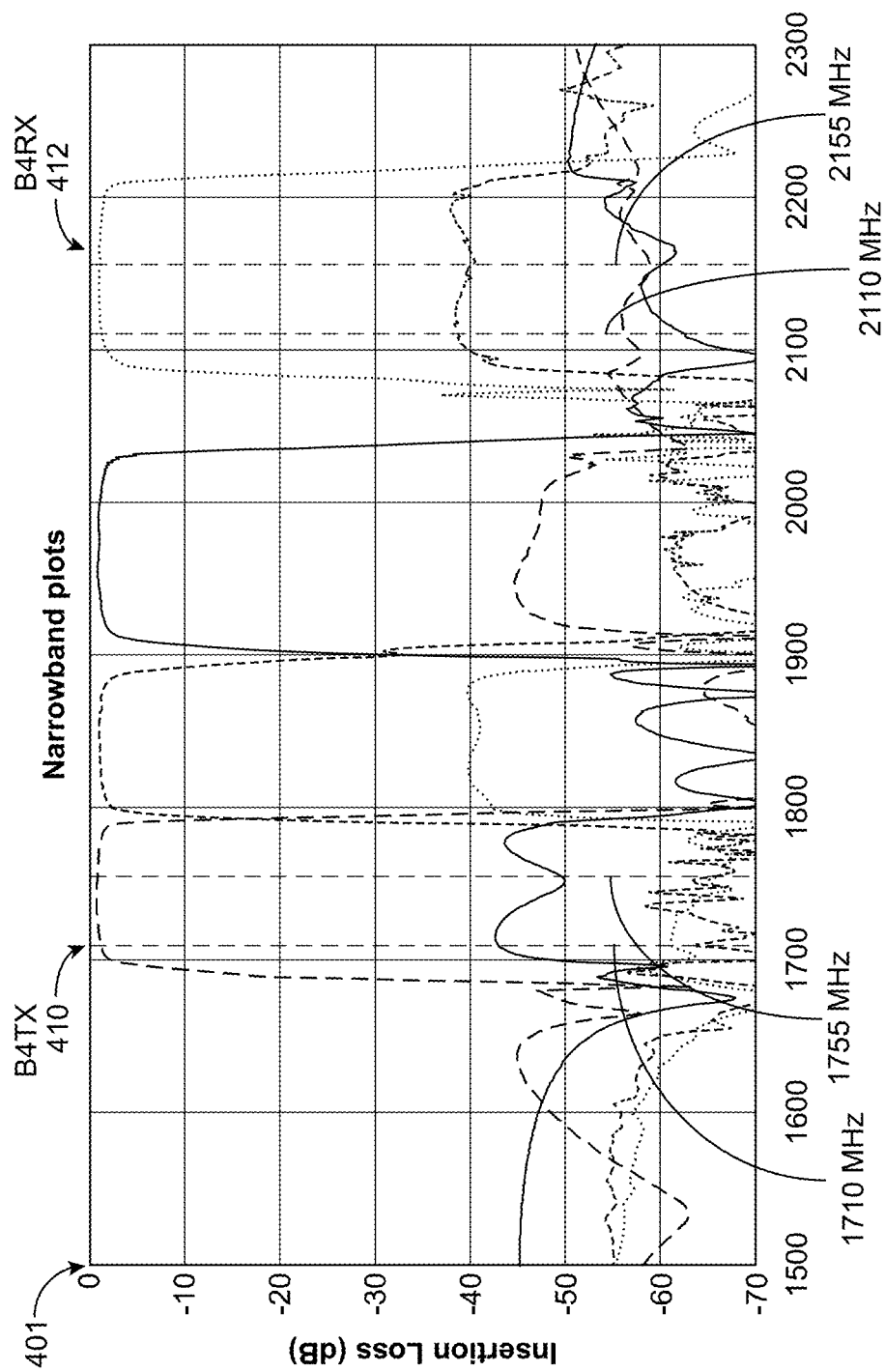
FIG. 4C is a chart of a multiband multiplexer insertion loss frequency response shown with an associated communication band for implementation with carrier aggregation according to aspects of the present disclosure.
Figure 4D:
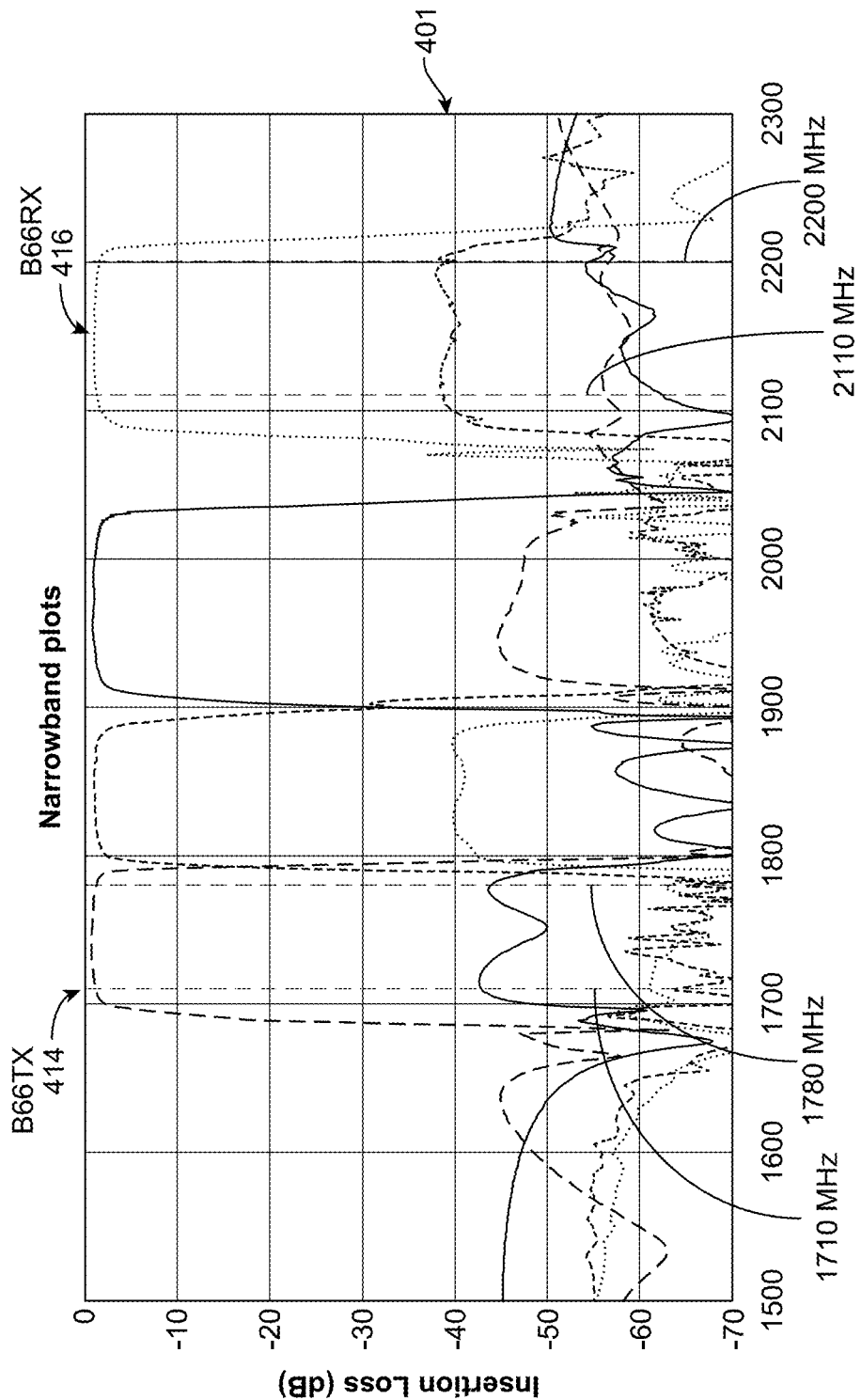
FIG. 4D is a chart of a multiband multiplexer insertion loss frequency response shown with an associated communication band for implementation with carrier aggregation according to aspects of the present disclosure.
Figure 4E:
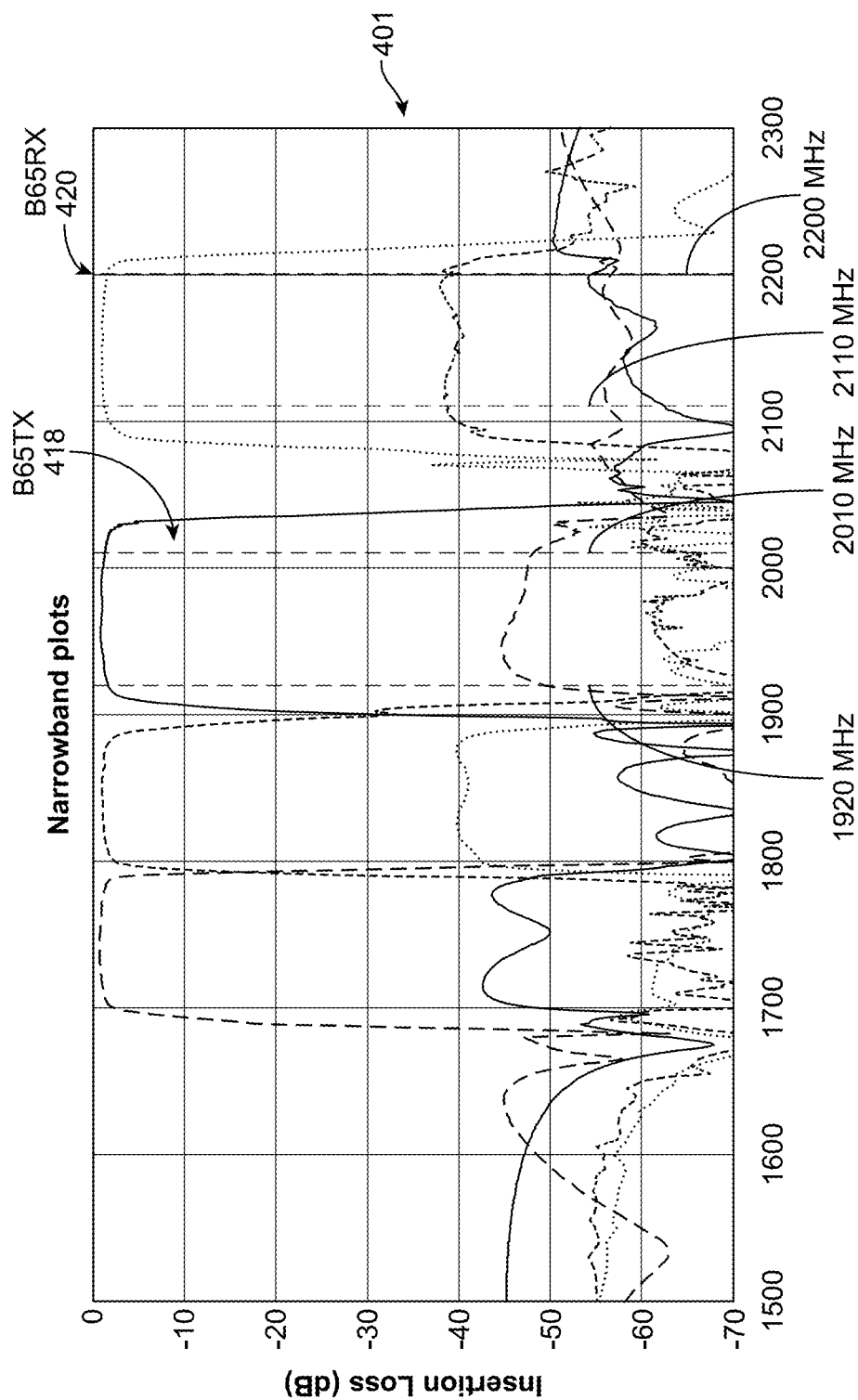
FIG. 4E is a chart of a multiband multiplexer insertion loss frequency response shown with an associated communication band for implementation with carrier aggregation according to aspects of the present disclosure.
Figure 4F:
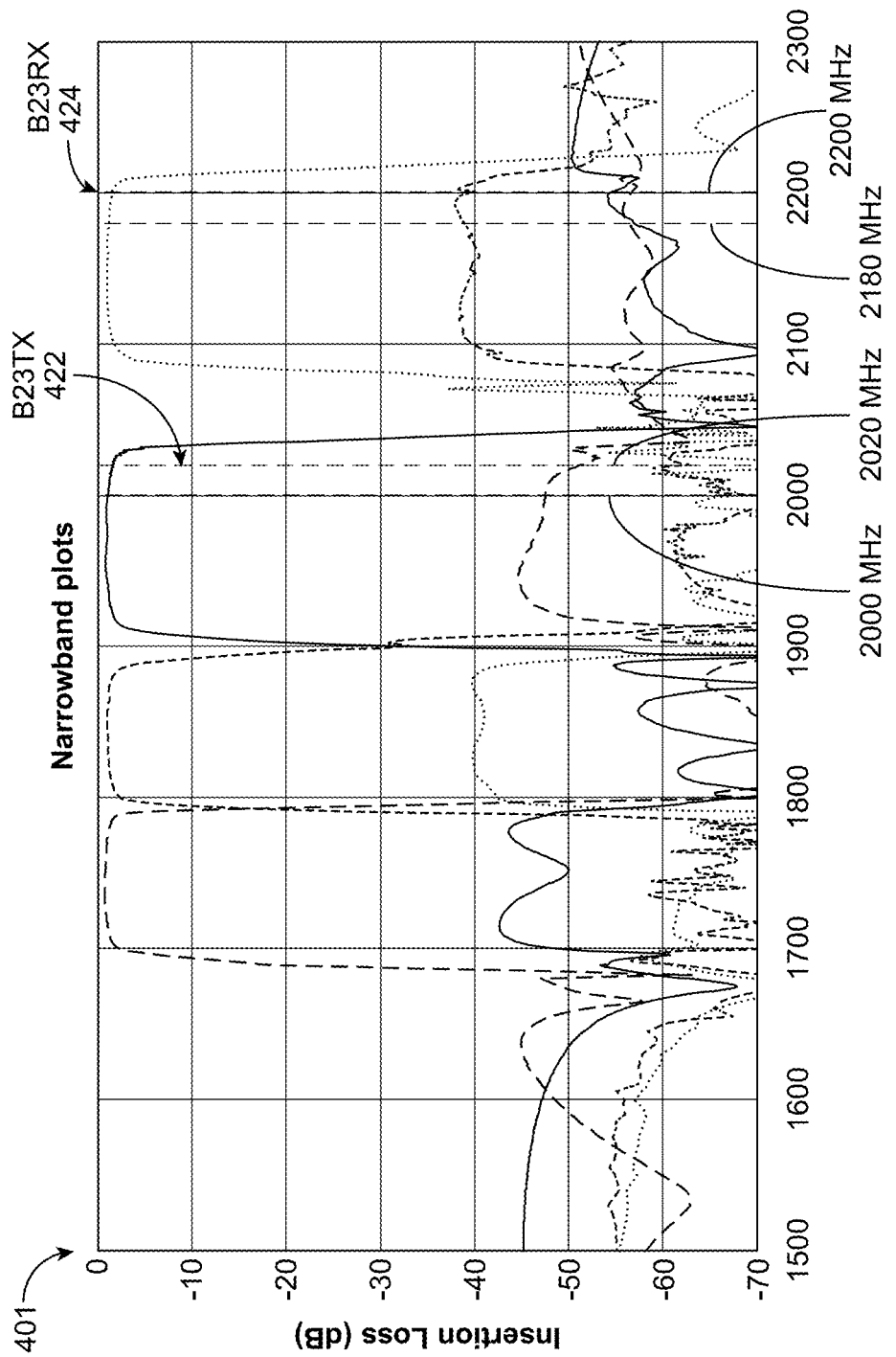
FIG. 4F is a chart of a multiband multiplexer insertion loss frequency response shown with an associated communication band for implementation with carrier aggregation according to aspects of the present disclosure.

FIGS. 4B-F illustrate a frequency response 401 for a single RF component that can filter six bands using four filter passbands. Each of the FIGS. 4B-F shows different communication bands overlaid on the filter frequency response 401 chart. FIG. 4B shows the band 1 TX range 402, the band 1 Rx range 404, the band 3 Tx range 406, and the band 3 Rx range 408. FIG. 4C shows the band 4 Tx range 410 and the band 4 Rx range 412. FIG. 4D shows the band 66 Tx range 414 and the band 66 Rx range 416. FIG. 4E shows the band 65 Tx range 418 and the band 65 Rx range 420. FIG. 4F shows the band 23 Tx range 422 and the band 23 Rx range 424 for a carrier aggregation scenario according to aspects of the present disclosure.

Figure 4G:
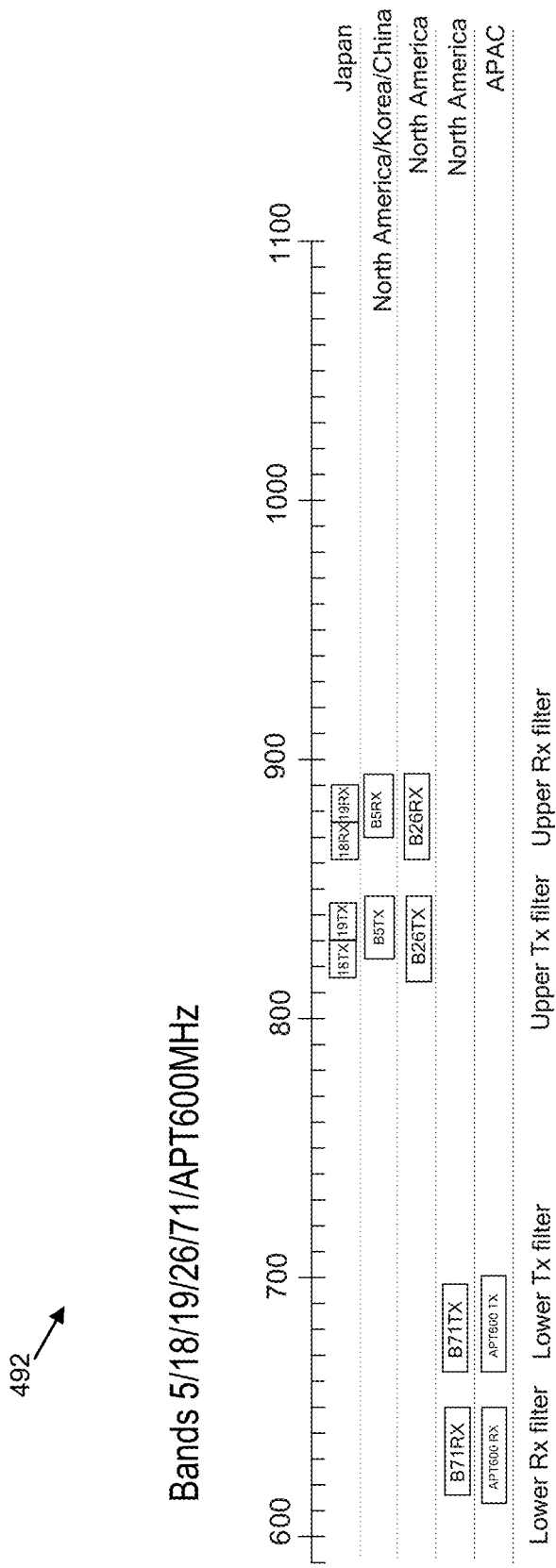
FIG. 4G is a diagram illustrating band combinations for a carrier aggregation scenario according to aspects of the present disclosure.

FIG. 4G is a diagram 492 illustrating band combinations for a carrier aggregation scenario according to aspects of the present disclosure. The above descriptions of FIGS. 4A-F describe a particular support for a grouping of bands by a multiband multiplexer. Additional designs can use similar structures with an RF component for a plurality of overlapping communication bands, in addition to the bands described above for FIGS. 4A-F. FIG. 4G describes LTE defined bands 5, 26, 71, and a new band at 600 MHz. Table 1 below illustrates details of such bands along with associated frequency ranges in MHz.

TABLE 1

| Frequency Band | Frequency range (MHz) TX | Frequency range (MHz) RX | Geographical area |
| --- | --- | --- | --- |
| 5 | 824-849 | 369 - 894 | North America/China |
| 18 | 815-830 | 360-875 | Japan |
| 19 | 830-845 | 875-890 | |
| 26 | 814-849 | 359-894 | North America |
| 71 | 663-698 | 617-652 | North America |
| APT600 MHz | 663-703 | 512-652 | Asia Pacific |

Figure 4H:
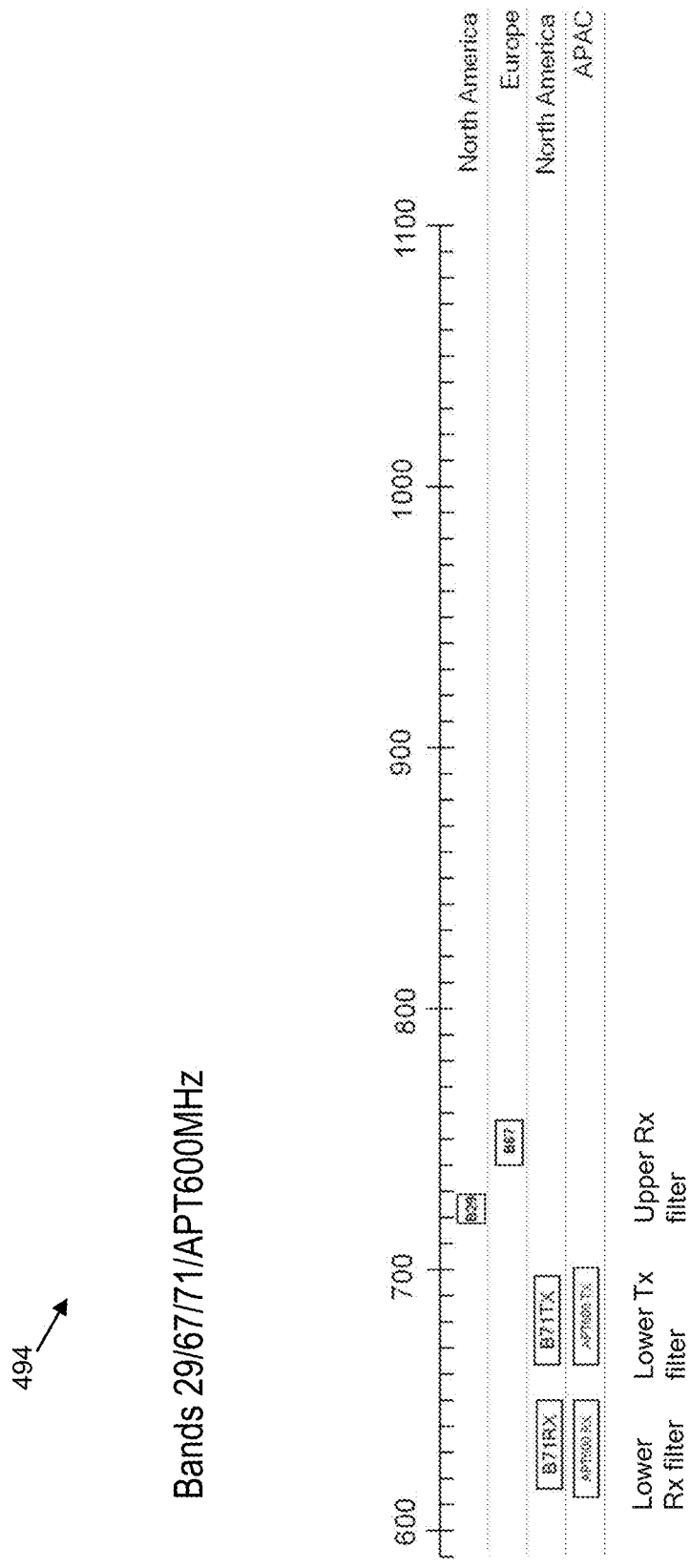
FIG. 4H is a diagram illustrating band combinations for a carrier aggregation scenario according to aspects of the present disclosure.

FIG. 4H is a diagram illustrating band combinations 494 for a carrier aggregation scenario according to aspects of the present disclosure. Just as above for FIG. 4G, FIG. 4H shows an alternate band combination, including LTE defined bands LTE defined bands 29, 67, and 71 combined with a new APT 600 MHz band. Table 2 below illustrates details of such bands along with associated frequency ranges in MHz.

TABLE 2

| Frequency Band | Frequency range (MHz) TX | Frequency range (MHz) RX | Geographical area |
| --- | --- | --- | --- |
| 29 | — | 717-728 | North America |
| 67 | — | 738-758 | Europe |
| 71 | 663-698 | 617-652 | North America |
| APT600 MHz | 663-703 | 612-652 | Asia Pacific |

While band combinations in diagrams 400 and 492 illustrate support for six bands that can be managed by a multiband multiplexer with four passbands (e.g., a quadplexer), it will be apparent that other configurations with other numbers of passbands can be used in accordance with examples described herein. Band combinations 494 includes passbands for four communication bands that can be handled by a single RF element structured as a triplexer to handle the illustrated overlapping frequencies of the illustrated communication bands. Additional aspects can include any number of passbands in a single element multiband multiplexer for bands with overlapping frequency ranges such that filter elements (e.g., using acoustoelectric resonators) can provide sufficient performance for the frequency ranges including the overlapping ranges of the communication bands supported by the RF element.

Figure 5A:
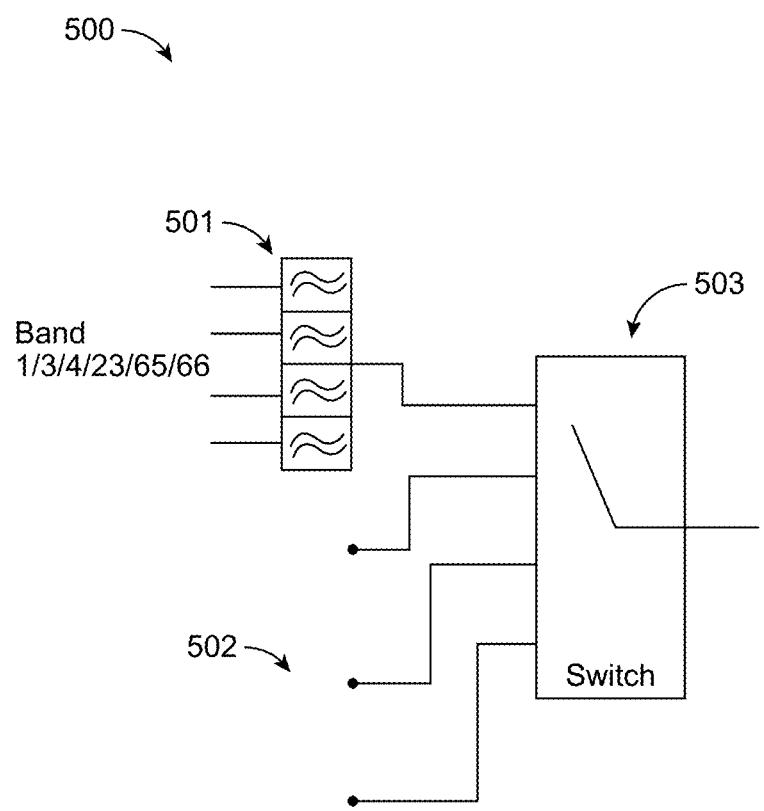
FIG. 5A is a schematic diagram of an example of a portion of a front-end circuit of a transceiver with a multiband multiplexer in accordance with aspects described herein.
Figure 5B:
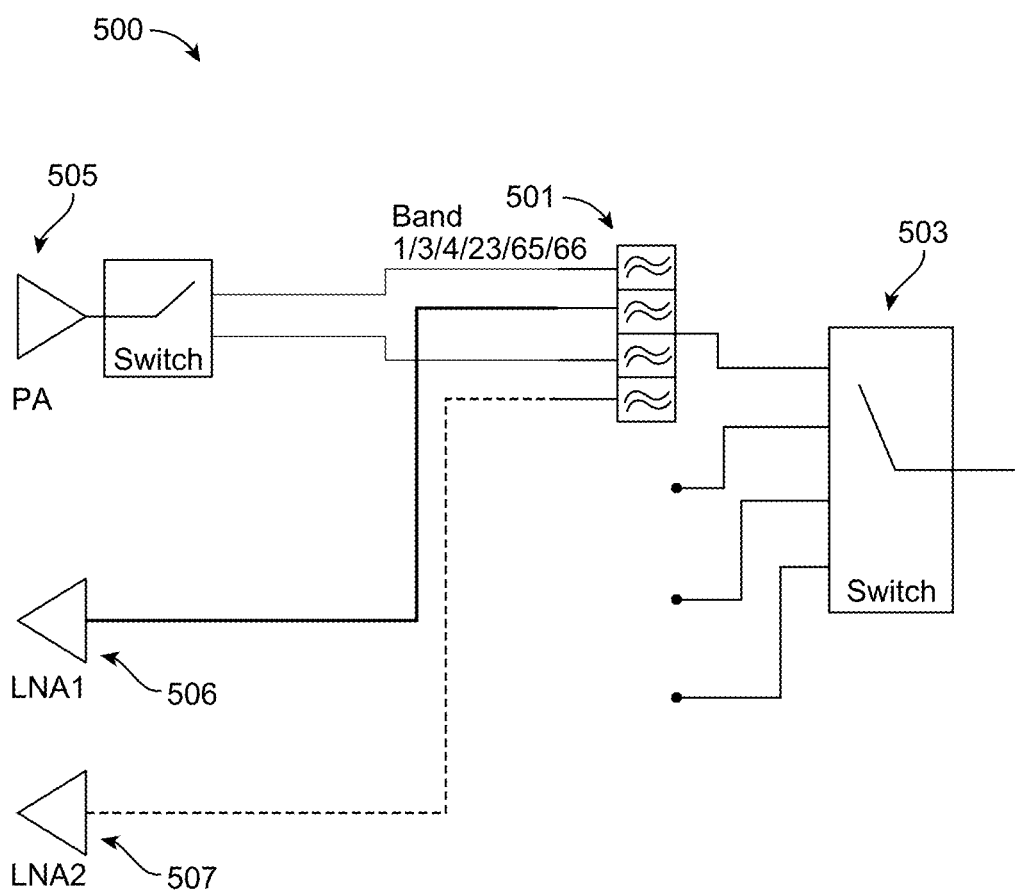
FIG. 5B is a schematic diagram of another example of a portion of a front-end circuit of a transceiver with a multiband multiplexer in accordance with aspects described herein.

FIG. 5A is a schematic diagram of an example of a portion of a front-end circuit 500 of a transceiver circuit of the wireless device 110 of FIG. 2 including a multiband multiplexer. FIG. 5B is a schematic diagram illustrating the portion of the front-end circuit 500 from FIG. 5A, with amplifiers 505, 506, and 507 connected to filter component 501. As illustrated in FIG. 5A and FIG. 5B, aspects of the multiband multiplexer include a single filter component 501 integrated into a communication path via switch 503 to support carrier aggregation of six communication bands (e.g., bands 1/3/4/23/65/66). In some aspects, additional components can be connected to switch inputs 502 to support additional communication bands (not shown). The multiband multiplexer is configured so that communications on any band in the system can be communicatively coupled to an antenna via switch 503. In some modes (e.g., certain carrier aggregation modes where multiple bands are active simultaneously), multiple inputs may be simultaneously connected to an antenna connection port when switch 503 is implemented as a switch network (e.g., multiple switches may be closed at the same time).

In one illustrative aspect of the disclosure, a single quadplexer structure with transmission and reception filter elements having passbands to cover multiple bands is provided to support six bands. The single quadplexer structure is configured to support the six bands without duplication of filtering.

Figure 6:
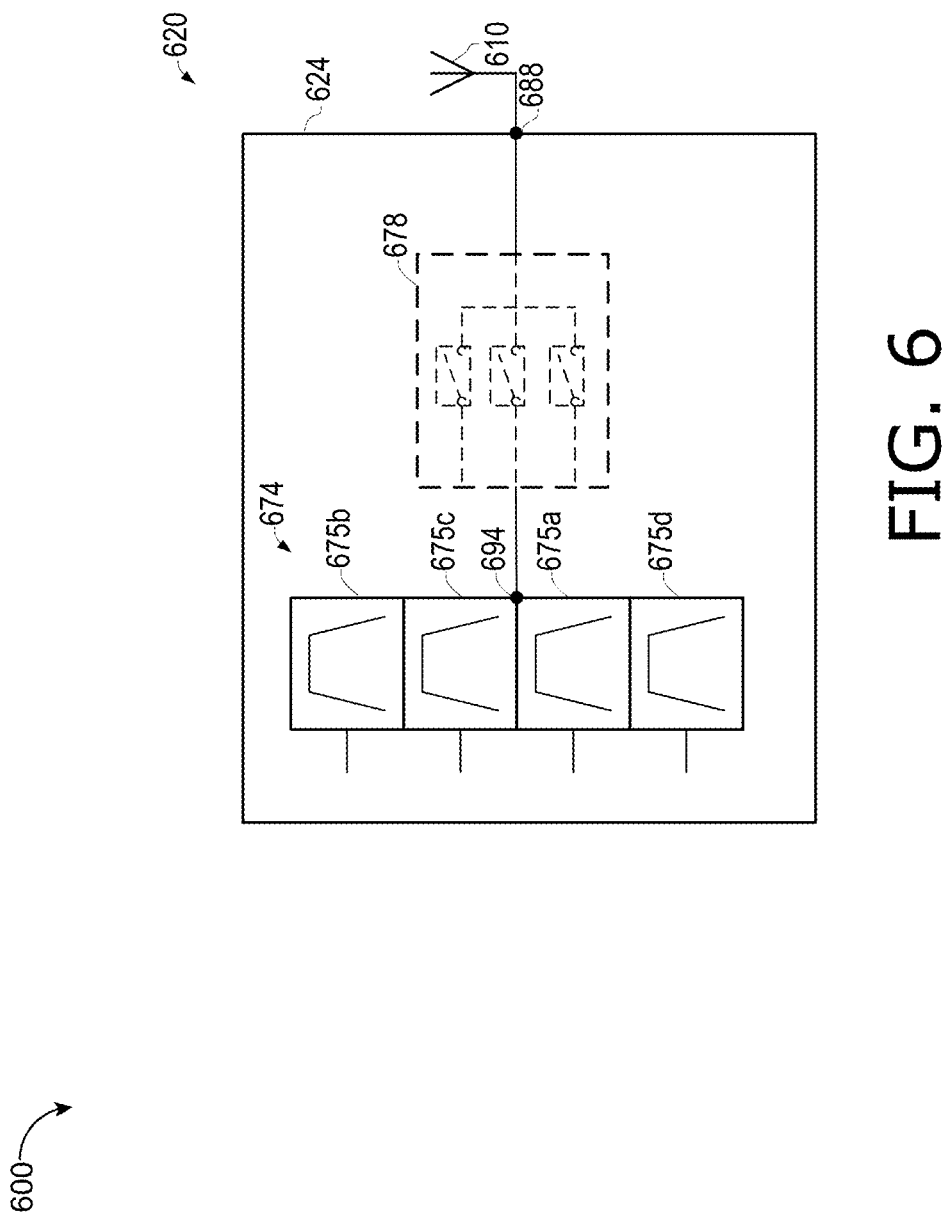
FIG. 6 is a schematic diagram of aspects of a multiband multiplexer according to aspects of the present disclosure.

FIG. 6 is a schematic diagram of an example of a portion of a plurality of filter circuits 674 within a front-end circuit 624 of a transceiver circuit 620 of the wireless device 110 of FIG. 2 according to aspects of the present disclosure. In one illustrative example, the plurality of filter circuits 674 may form a quadplexer (e.g., similar to the single filter component 501) and may be connected to a common port 694. The common port 694 may be referred to as a carrier aggregation port. As described herein, a multiplexer such as the single filter component 501 can be used to support efficient signal processing for multiple carrier bands, and the common port 694 can function as a port to support signals for multiple carriers (e.g., as a carrier aggregation port). The plurality of filter circuits 674 is configured to filter one or more signals transmitted and received over at least one of six predefined communication bands.

In accordance with aspects described herein, the plurality of filter circuits 674 (e.g., including filter elements 675a, 675b, 675c, and 675d) can be implemented as a single component within a wireless communication device, with associated size, cost, and performance benefits described above. In some aspects, each of the filter elements of filter circuit 674 can be associated with a different passband illustrated in FIGS. 4B through 4F. For example, in some aspects, the plurality of filter circuits 674 can be configured to implement a first passband for filter element 675a between 1920 MHz and 2020 MHz, a second passband for filter element 675b between 1710 MHz and 1785 MHz, a third passband for filter element 675c between 2110 MHz and 2200 MHz, and a fourth passband for filter element 675d between 1800 MHz and 1880 MHz. These passbands correspond to the illustrated passbands shown in FIGS. 4B through 4F. In other implementations, different numbers of filter elements can be used, and different passbands can be used (e.g., passbands corresponding to coverage of the different overlapping band frequencies of FIGS. 4G and 4H).

In the example of FIG. 6, the plurality of filter circuits 674 includes a first filter element 675a configured to have a first passband that spans both a first transmission frequency range of a first predefined communication band and a second transmission frequency range of a second predefined communication band. The first transmission frequency range is overlapping and/or substantially adjacent to the second transmission frequency range. In one illustrative example, the first filter element 675a is configured as a transmit path filter (e.g., transmit filter). In some aspects, the second transmission frequency range may be partially overlapping with the first transmission frequency range (and having at least some portion extending beyond a definition of the first transmission frequency rage of the second predefined communication band). In some examples, a receive filter covers Rx frequency ranges for multiple overlapping communication bands (e.g., band 66 Rx, band 65 Rx, band 4 Rx, band 1 Rx, and band 23 Rx all covering portions of the passband of a filter from 2110 MHz to 2200 MHz).

While not shown in FIG. 6, the transceiver circuit 620 further includes a power amplifier and a connection port 688 configured to electrically connect to an antenna 610. In this case at least one of the plurality of filter circuits 674 is selectively electrically connected between the power amplifier and the connection port 688 (there may be intervening circuit elements between either the power amplifier and the plurality of filter circuits 674 or the antenna 610).

Furthermore, the front-end circuit 624 may include one or more electronic switching components 678 electrically connected between the plurality of filter circuits 674 and the connection port 688 configured to electrically connect to an antenna 610. Connections to other inputs of the electronic switching components 678 are not shown in FIG. 6 but are there to show that there may be other filter circuits selectively connected to the connection port 688. As such, in certain implementations there may optionally be a switch between the output of the plurality of filter circuits 674 and the connection port 688 to selectively connect the plurality of filter circuits 674 to the connection port 688 and on to antenna 610. The electronic switching component 678 are shown optional in FIG. 6 to illustrate that the plurality of filter circuits 674 may be provided in various implementations or in a module which connects to an antenna interface without including other filters.

As described above, in one illustrative example, the plurality of filter circuits 674 can be implemented using a first passband for the filter element 675a between 1920 MHz and 2020 MHz, a second passband for the filter element 675b between 1710 MHz and 1785 MHz, a third passband for the filter element 675c between 2110 MHz and 2200 MHz, and a fourth passband for the filter element 675d between 1800 MHz and 1880 MHz. In such an example, by using the above-noted passbands, the various filter circuits 674 can support performance for LTE defined bands 1, 3, 4, 23, 65, and 66. For instance, using such passbands, the filter circuits 674 can support the transmit and receive bands for frequency ranges of each of these six bands, including support for the first transmission frequency range including frequencies between 1920 MHz and 1980 MHz, the first reception frequency range that includes frequencies between 2110 MHz and 2170 MHz, the second transmission frequency range that includes frequencies between 1710 MHz and 1785 MHz, the second reception frequency range that includes frequencies between 1805 MHz and 1880 MHz, the third transmission frequency range that includes frequencies between 1710 MHz and 1755 MHz, the third reception frequency range that includes frequencies between 2110 MHz and 2155 MHz, the fourth transmission frequency range that includes frequencies between 2000 MHz and 2020 MHz, the fourth reception frequency range that includes frequencies between 2180 MHz and 2200 MHz, the fifth transmission frequency range that includes frequencies between 1920 MHz and 2010 MHz, the fifth reception frequency range that includes frequencies between 2110 MHz and 2200 MHz, the sixth transmission frequency range that includes frequencies between 1710 MHz and 1780 MHz, and the sixth reception frequency range that includes frequencies between 2110 MHz and 2200 MHz.

In certain aspects, the transceiver circuit 620 may include one or more other filter circuits and a plurality of switching components where the plurality of switching components are electrically connected between a node and both the plurality of filter circuits and the one or more other filter circuits. In certain aspects, the transceiver circuit 620 includes a diplexer electrically connected between an antenna 610 and the plurality of filter circuits 674. In an aspect, the plurality of filter circuits comprises one or more acoustic wave resonators for example such as at least one of a surface acoustic wave component or a bulk acoustic wave component.

Figure 7:
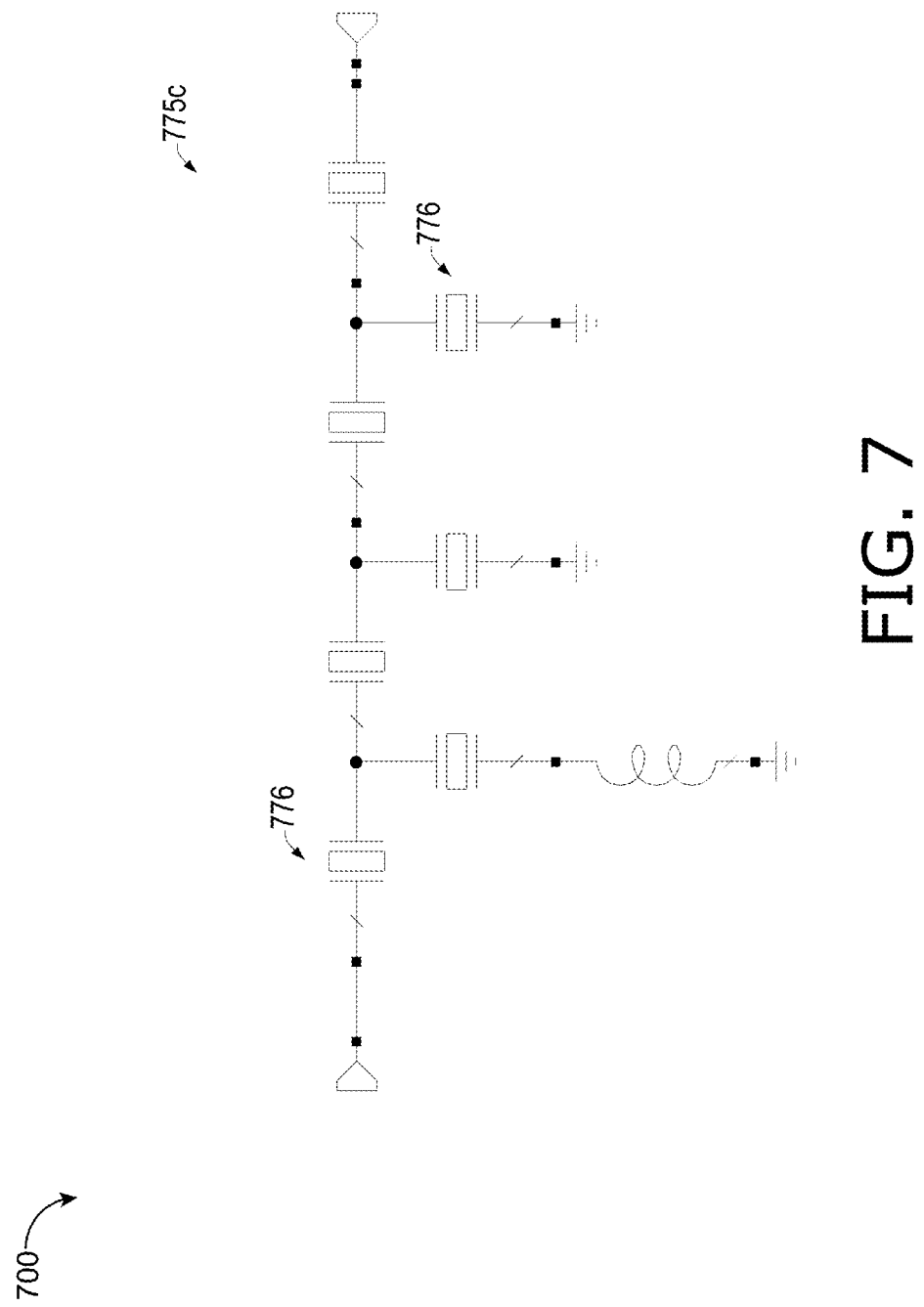
FIG. 7 is a schematic diagram of an example of an implementation of a filter element that may correspond to one of the filter elements of FIG. 6 in accordance with some aspects.

FIG. 7 is a schematic diagram of an example of an implementation of a filter element 775c that may correspond to any of the filter elements 675a-d of FIG. 6 to implement passbands as illustrated in FIGS. 4B-F. FIG. 7 provides one example of a topology that may be used for the filter element 675c of FIG. 6. Similar topologies may be used to form the other filter elements described herein according to the passbands described above. The filter element 775c includes a ladder network topology that may be surface acoustic wave (SAW) resonators or bulk acoustic wave (BAW) resonators 776 (or other resonant structures) connected in both series and shunt configurations (and may include one or more inductors or capacitors). Based on the selected resonator dimensions, thickness, materials, and other characteristics of the resonators the desired passband may be achieved according to the topology shown. The configuration shown in FIG. 7 illustrates electroacoustic resonators (or that may include hybrid LC acoustic resonators, cavity type resonators, or other types of resonators) to provide for a passband that spans the desired frequency range. As described herein, SAW, BAW, and other devices can be referred to as resonators or electroacoustic resonators. Aspects of the present disclosure are directed to RF filters for filtering a signal for a particular frequency or range of frequencies, particularly in a multi-band context, where multiple filters can be used to send signals to a shared antenna. Aspects of the present disclosure use resonant structures added to RF filters to achieve filter performance for the described multiband multiplexers to use a single component to filter six or more communication bands in accordance with aspects described herein.

FIG. 8A is a diagram of a perspective view of an example of an electroacoustic device 800. The electroacoustic device 800 may be configured as or be a portion of a SAW resonator. In certain descriptions herein, the electroacoustic device 800 may be referred to as a SAW resonator. However, there may be other electroacoustic device types (e.g., BAW or TFBAR) that may be constructed based on the principles similar to those described herein. The electroacoustic device 800 includes an electrode structure 804, that may be referred to as an interdigital transducer (IDT), on the surface of a piezoelectric material 802. The electrode structure 804 generally includes first and second comb shaped electrode structures (conductive and generally metallic) with electrode fingers extending from two busbars towards each other arranged in an interlocking manner in between two busbars (e.g., arranged in an interdigitated manner). An electrical signal excited in the electrode structure 804 (e.g., applying an AC voltage) is transformed into an acoustic wave 806 that propagates in a particular direction via the piezoelectric material 802. The acoustic wave 806 is transformed back into an electrical signal and provided as an output. In many applications, the piezoelectric material 802 has a particular crystal orientation such that when the electrode structure 804 is arranged relative to the crystal orientation of the piezoelectric material 802, the acoustic wave mainly propagates in a direction perpendicular to the direction of the fingers (e.g., parallel to the busbars).

FIG. 8B is a diagram of a side view of the electroacoustic device 800 of FIG. 8A along a cross-section 807 shown in FIG. 8A. The electroacoustic device 800 is illustrated by a simplified layer stack including a piezoelectric material 802 with an electrode structure 804 disposed on the piezoelectric material 802. The electrode structure 804 is conductive and generally formed from metallic materials. The piezoelectric material may be formed from a variety of materials such as quartz, lithium tantalate (LiTaO3), lithium niobite (LiNbO3), doped variants of these, or other piezoelectric materials. It should be appreciated that more complicated layer stacks (e.g., 4 stacks, 6 stacks, etc.) including layers of various materials may be possible within the stack. For example, optionally, a temperature compensation layer 808 denoted by the dashed lines may be disposed above the electrode structure 804. The piezoelectric material 802 may be extended with multiple interconnected electrode structures disposed thereon to form a multi-resonator filter or to provide multiple filters. While not illustrated, when provided as an integrated circuit component, a cap layer may be provided over the electrode structure 804. The cap layer is applied so that a cavity is formed between the electrode structure 804 and an under surface of the cap layer. Electrical vias or bumps that allow the component to be electrically connected to connections on a substrate (e.g., via flip-chip or other techniques) may also be included.

FIG. 9A is a diagram of a top view of an example of an electrode structure 904a of an electroacoustic device 800. The electrode structure 904a has an IDT 905 that includes a first busbar 922 (e.g., first conductive segment or rail) electrically connected to a first terminal 920 and a second busbar 924 (e.g., second conductive segment or rail) spaced from the first busbar 922 and connected to a second terminal 930. A plurality of conductive fingers 926 are connected to either the first busbar 922 or the second busbar 924 in an interdigitated manner. Fingers 926 connected to the first busbar 922 extend towards the second busbar 924 but do not connect to the second busbar 924 so that there is a small gap between the ends of these fingers 926 and the second busbar 924. Likewise, fingers 926 connected to the second busbar 924 extend towards the first busbar 922 but do not connect to the first busbar 922 so that there is a small gap between the ends of these fingers 926 and the first busbar 922.

In the direction along the busbars 922 and 924, there is an overlap region including a central region where a portion of one finger overlaps with a portion of an adjacent finger (as illustrated by the central region 925). The central region 925 including the overlap may be referred to as the aperture, track, or active region where electric fields are produced between fingers 926 to cause an acoustic wave to propagate in the piezoelectric material 802. The periodicity of the fingers 926 is referred to as the pitch of the IDT. The pitch may be indicted in various ways. For example, in certain aspects, the pitch may correspond to a magnitude of a distance between fingers in the central region 925. The distance may be defined, for example, as the distance between center points of each of the fingers (and may be generally measured between a right (or left) edge of one finger and the right (or left) edge of an adjacent finger when the fingers have uniform thickness). In certain aspects, an average of distances between adjacent fingers may be used for the pitch. The frequency at which the piezoelectric material vibrates is a self-resonance (also called a "main-resonance") frequency of the electrode structure 904a. The frequency is determined at least in part by the pitch of the IDT 905 and other properties of the electroacoustic device 800.

The IDT 905 is arranged between two reflectors 928 which reflect the acoustic wave back towards the IDT 905 for the conversion of the acoustic wave into an electrical signal via the IDT 905 in the configuration shown and to prevent losses (e.g., confine and prevent escaping acoustic waves). Each reflector 928 has two busbars and a grating structure of conductive fingers that each connect to both busbars. The pitch of the reflector may be similar to or the same as the pitch of the IDT 905 to reflect acoustic waves in the resonant frequency range. But many configurations are possible.

When converted back to an electrical signal, the converted electrical signal may be provided as an output such as one of the first terminal 920 or the second terminal 930 while the other terminal may function as an input.

A variety of electrode structures are possible. FIG. 9A may generally illustrate a one-port configuration. Other 9-port configurations are also possible. For example, the electrode structure 904a may have an input IDT 905 where each terminal 920 and 930 functions as an input. In some such structures, an adjacent output IDT (not illustrated) that is positioned between the reflectors 928 and adjacent to the input IDT 905 may be provided to convert the acoustic wave propagating in the piezoelectric material 802 to an electrical signal to be provided at output terminals of the output IDT.

FIG. 9B is a diagram of a top view of another aspect of an electrode structure 904b of an electroacoustic device 800. In some cases, a dual-mode SAW (DMS) electrode structure 904b is illustrated that is a structure which may induce multiple resonances. The electrode structure 904b includes multiple IDTs along with reflectors 928 connected as illustrated. The electrode structure 904b is provided to illustrate the variety of electrode structures that principles described herein may be applied to including the electrode structures 904a and 904b of FIGS. 9A and 9B.

It should be appreciated that while a certain number of fingers 926 are illustrated, the number of actual fingers and lengths and width of the fingers 926 and busbars may be different in an actual implementation. Such parameters depend on the particular application and desired frequency of the filter. In addition, a SAW filter may include multiple interconnected electrode structures each including multiple IDTs to achieve a desired passband (e.g., multiple interconnected resonators or IDTs to form a desired filter transfer function).

Figure 10A:
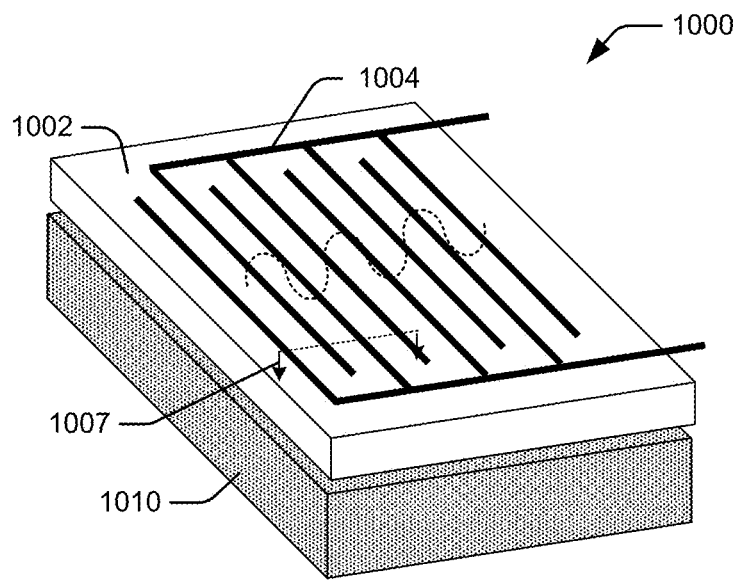
FIG. 10A is a diagram of a perspective view of another example of an electroacoustic device for use with some examples described herein.

FIG. 10A is a diagram of a perspective view of another aspect of an electroacoustic device 1000. The electroacoustic device 1000 (e.g., that may be configured as or be a part of a SAW resonator) is similar to the electroacoustic device 800 of FIG. 8A but has a different layer stack. In particular, the electroacoustic device 1000 includes a thin piezoelectric material 1002 that is provided on a substrate 1010 (e.g., silicon). The electroacoustic device 1000 may be referred to as a thin-film SAW resonator (TF-SAW) in some cases. Based on the type of piezoelectric material 1002 used (e.g., typically having higher coupling factors relative to the electroacoustic device 800 of FIG. 8A) and a controlled thickness of the piezoelectric material 1002, the particular acoustic wave modes excited may be slightly different than those in the electroacoustic device 800 of FIG. 8A. Based on the design (thicknesses of the layers, and selection of materials, etc.), the electroacoustic device 1000 may have a higher Q-factor as compared to the electroacoustic device 800 of FIG. 8A. The piezoelectric material 1002, for example, may be Lithium tantalate (LiTaO3) or some doped variant. Another example of a piezoelectric material 1002 for FIG. 10A may be Lithium niobite (LiNbO3). In general, the substrate 1010 may be substantially thicker than the piezoelectric material 1002 (e.g., potentially on the order of 50 to 100 times thicker as one example—or more). The substrate 1010 may include other layers (or other layers may be included between the substrate 1010 and the piezoelectric material 1002).

Figure 10B:
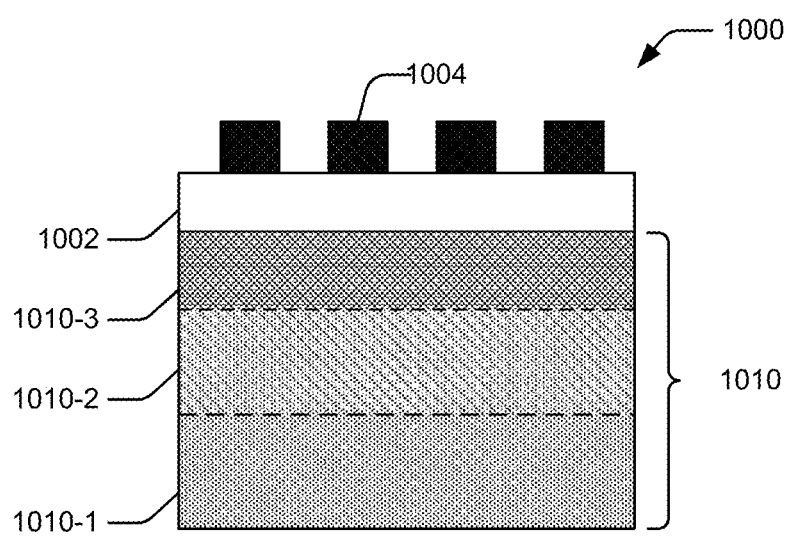
FIG. 10B is a diagram of a side view of the electroacoustic device of FIG. 10A.

FIG. 10B is a diagram of a side view of the electroacoustic device 1000 of FIG. 10A showing an exemplary layer stack (along a cross-section 1007). In the aspect shown in FIG. 10B, the substrate 1010 may include sublayers such as a substrate sublayer 1010-1 (e.g., of silicon) that may have a higher resistance (e.g., relative to the other layers—high resistivity layer). The substrate 1010 may further include a trap rich layer 1010-2 (e.g., poly-silicon). The substrate 1010 may further include a compensation layer 1010-3 (e.g., silicon dioxide (SiO2) or another dielectric material) that may provide temperature compensation and other properties. These sub-layers may be considered part of the substrate 1010 or their own separate layers. A relatively thin piezoelectric material 1002 is provided on the substrate 1010 with a particular thickness for providing a particular acoustic wave mode (e.g., as compared to the electroacoustic device 800 of FIG. 8A where the thickness of the piezoelectric material 802 may not be a significant design parameter beyond a certain thickness and may be generally thicker as compared to the piezoelectric material 1002 of the electroacoustic device 1000 of FIGS. 10A and 10B). The electrode structure 1004 is positioned above the piezoelectric material 1002. In addition, in some aspects, there may be one or more layers (not shown) possible above the electrode structure 1004 (e.g., such as a thin passivation layer).

Based on the type of piezoelectric material, the thickness, and the overall layer stack, the coupling to the electrode structure 1004 and acoustic velocities within the piezoelectric material in different regions of the electrode structure 1004 may differ between different types of electroacoustic devices such as between the electroacoustic device 800 of FIG. 8A and the electroacoustic device 1000 of FIGS. 10A and 10B.

Figure 11:
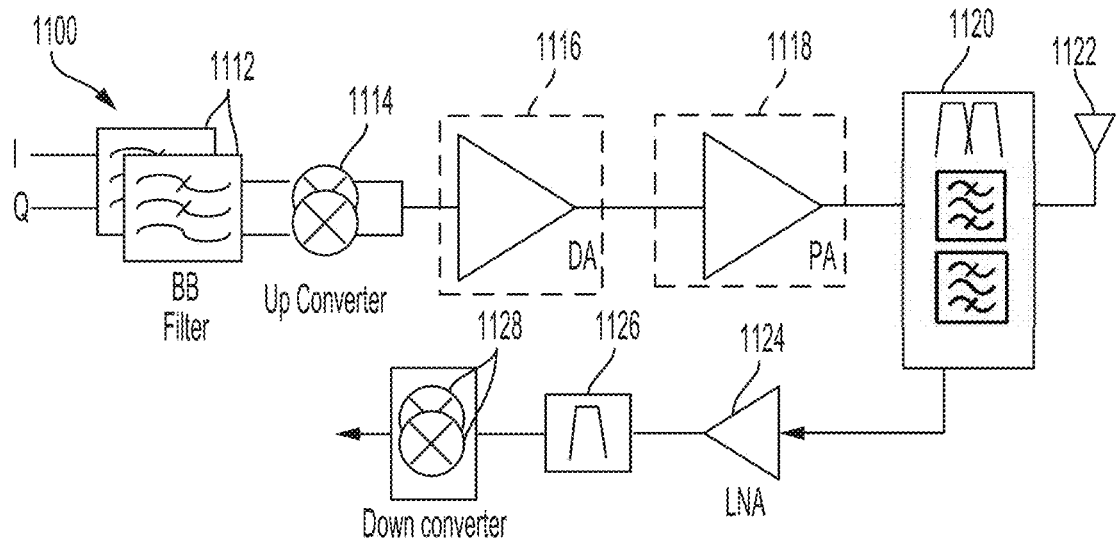
FIG. 11 is a functional block diagram of at least a portion of an example of a simplified wireless transceiver circuit in which the filter circuits and associated multiplexer structures described herein may be employed.

FIG. 11 is a functional block diagram of at least a portion of an aspect of a simplified wireless transceiver circuit 1100 in which the circuit 620 of FIG. 6 may be employed. The transceiver circuit 1100 is configured to receive signals/information for transmission (shown as I and Q values) which is provided to one or more base band filters 1112. The filtered output is provided to one or more mixers 1114. The output from the one or more mixers 1114 is provided to a driver amplifier 1116 whose output is provided to a power amplifier 1118 to produce an amplified signal for transmission. The amplified signal is output to the antenna 1122 through one or more filters 1120 (e.g., duplexers if used as a frequency division duplex transceiver or other filters). The one or more filters 1120 may include the circuit 620 of FIG. 6. The antenna 1122 may be used for both wirelessly transmitting and receiving data. The transceiver circuit 1100 includes a receive path through the one or more filters 1120 to be provided to a low noise amplifier (LNA) 1124 and a further filter 1126 and then down-converted from the receive frequency to a baseband frequency through one or more mixer circuits 1128 before the signal is further processed (e.g., provided to an analog digital converter and then demodulated or otherwise processed in the digital domain). There may be separate filters for the receive circuit (e.g., may have a separate antenna or have separate receive filters) that may be implemented using the circuit 620 of FIG. 6.

Figure 12:
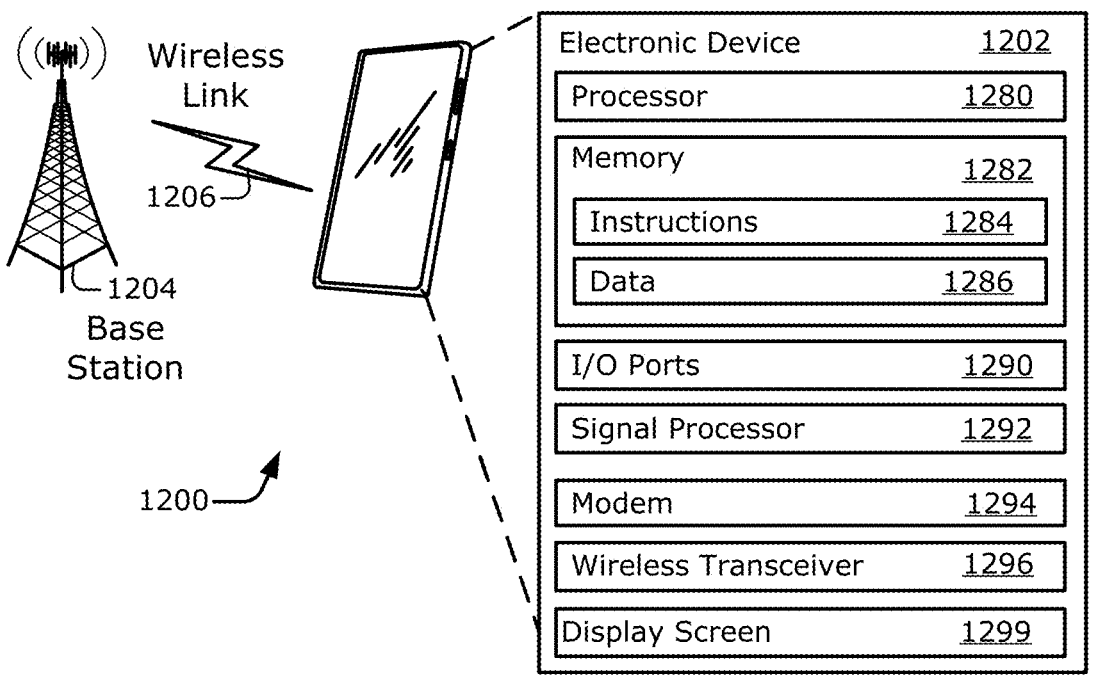
FIG. 12 is a diagram of an environment that includes an electronic device that includes a wireless transceiver such as the transceiver circuit of FIG. 11.

FIG. 12 is a diagram of an environment 1200 that includes an electronic device 1202 that includes a wireless transceiver 1296 such as the transceiver circuit 1100 of FIG. 11. In some aspects, the electronic device 1202 includes a display screen 1299 that can be used to display information associated with data transmitted via wireless link 1206 and processed using components of electronic device 1202 described below. Other aspects of an electronic device in accordance with aspects described herein using a low phase delay filter for multi-band communication can be configured without a display screen. In the environment 1200, the electronic device 1202 communicates with a base station 1204 through a wireless link 1206. As shown, the electronic device 1202 is depicted as a smart phone. However, the electronic device 1202 may be implemented as any suitable computing or other electronic device, such as a cellular base station, broadband router, access point, cellular or mobile phone, gaming device, navigation device, media device, laptop computer, desktop computer, tablet computer, server computer, network-attached storage (NAS) device, smart appliance, an automobile including a vehicle-based communication system, Internet of Things (IoT) device, sensor or security device, asset tracker, and so forth.

The base station 1204 communicates with the electronic device 1202 via the wireless link 1206, which may be implemented as any suitable type of wireless link. Although depicted as a base station tower of a cellular radio network, the base station 1204 may represent or be implemented as another device, such as a satellite, terrestrial broadcast tower, access point, peer to peer device, mesh network node, fiber optic line, another electronic device generally as described above, and so forth. Hence, the electronic device 1202 may communicate with the base station 1204 or another device via a wired connection, a wireless connection, or a combination thereof. The wireless link 1206 can include a downlink of data or control information communicated from the base station 1204 to the electronic device 1202 and an uplink of other data or control information communicated from the electronic device 1202 to the base station 1204. The wireless link 1206 may be implemented using any suitable communication protocol or standard, such as 3rd Generation Partnership Project Long-Term Evolution (3GPP LTE, 3GPP NR 5G), IEEE 802.11, IEEE 802.16, Bluetooth™, and so forth.

The electronic device 1202 includes a processor 1280 and a memory 1282. The memory 1282 may be or form a portion of a computer readable storage medium. The processor 1280 may include any type of processor, such as an application processor or a multi-core processor, that is configured to execute processor-executable instructions (e.g., code) stored by the memory 1282. The memory 1282 may include any suitable type of data storage media, such as volatile memory (e.g., random access memory (RAM)), non-volatile memory (e.g., Flash memory), optical media, magnetic media (e.g., disk or tape), and so forth. In the context of the disclosure, the memory 1282 is implemented to store instructions 1284, data 1286, and other information of the electronic device 1202, and thus when configured as or part of a computer readable storage medium, the memory 1282 does not include transitory propagating signals or carrier waves.

The electronic device 1202 may also include input/output ports 1290. The I/O ports 1290 enable data exchanges or interaction with other devices, networks, or users or between components of the device.

The electronic device 1202 may further include a signal processor (SP) 1292 (e.g., such as a digital signal processor (DSP)). The signal processor 1292 may function similar to the processor and may be capable executing instructions and/or processing information in conjunction with the memory 1282.

For communication purposes, the electronic device 1202 also includes a modem 1294, a wireless transceiver 1296, and an antenna (not shown). The wireless transceiver 1296 provides connectivity to respective networks and other electronic devices connected therewith using radio-frequency (RF) wireless signals and may include the transceiver circuit 1100 of FIG. 11. The wireless transceiver 1296 may facilitate communication over any suitable type of wireless network, such as a wireless local area network (LAN) (WLAN), a peer to peer (P2P) network, a mesh network, a cellular network, a wireless wide area network (WWAN), a navigational network (e.g., the Global Positioning System (GPS) of North America or another Global Navigation Satellite System (GNSS)), and/or a wireless personal area network (WPAN).

Figure 13:
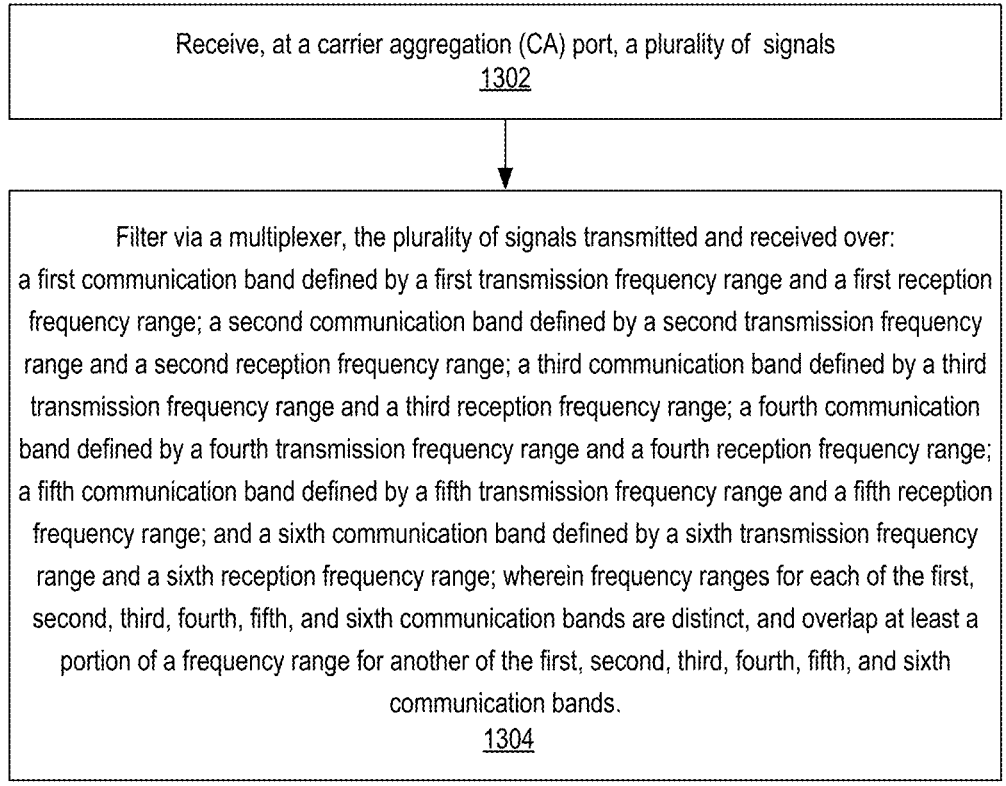
FIG. 13. illustrates a method for operation of an electroacoustic device in accordance with some aspects.

FIG. 13 describes a method 1300 for filtering a plurality of signals for wireless communications. In some implementations, the method 1300 is performed by any apparatus described herein. In some implementations, the method 1300 is implemented as instructions in a computer readable storage medium, such that when the instructions are executed by processing circuitry of a wireless communication apparatus, the apparatus performs the operations of the method 1300.

The method 1300 includes operation 1302 which involves receiving, at a carrier aggregation (CA) port, the plurality of signals. As described above, the CA port may, in some implementations, be the common port 694. Further, in some implementations a multiplexer (e.g., a quadplexer) such as the single filter component 501 can be used to support efficient signal processing for multiple carrier bands, and the common port 694 can function as a port to support signals for multiple carriers (e.g., as a carrier aggregation port) passing through such a multiplexer.

The method 1300 additionally includes operation 1304, which involves filtering, via a multiplexer, the plurality of signals transmitted and received over: a first communication band defined by a first transmission frequency range and a first reception frequency range; a second communication band defined by a second transmission frequency range and a second reception frequency range; a third communication band defined by a third transmission frequency range and a third reception frequency range; a fourth communication band defined by a fourth transmission frequency range and a fourth reception frequency range; a fifth communication band defined by a fifth transmission frequency range and a fifth reception frequency range; and a sixth communication band defined by a sixth transmission frequency range and a sixth reception frequency range; where frequency ranges for each of the first, second, third, fourth, fifth, and sixth communication bands are distinct, and overlap at least a portion of a frequency range for another of the first, second, third, fourth, fifth, and sixth communication bands.

The various operations, functions of the apparatus aspects, and methods described above may be performed by any suitable means capable of performing the corresponding functions. The means may include various hardware and/or software component(s) and/or module(s), including, but not limited to a circuit, an application-specific integrated circuit (ASIC), or processor. For example, the means for filtering one or more signals may correspond to the plurality of filter circuits 674 of FIG. 6. For example, a first means for filtering may correspond to the first filter element 675*a* of FIG. 6. A second means for filtering may correspond to the second filter element 675*b* of FIG. 6. A third means for filtering may correspond to the third filter element 675*c* of FIG. 6. A fourth means for filtering may correspond to the further filter element 675*d* of FIG. 6.

Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general-purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The bus may also link various other circuits such as timing sources, peripherals, voltage regulators, power management circuits, and the like.

It is to be understood that the claims are not limited to the precise configuration and components illustrated above. Various modifications, changes and variations may be made in the arrangement, operation and details of the methods and apparatus described above without departing from the scope of the claims.

Illustrative aspects of the present disclosure include:

Aspect 1: An apparatus for filtering one or more signals for wireless communications, the apparatus comprising: a first filter element configured to have a first passband that spans a first predefined frequency range of a first communication band and a second predefined frequency range of a second communication band, wherein the first predefined frequency range overlaps a portion of the second predefined frequency range; a second filter element configured to have a second passband distinct from the first passband; a third filter element configured to have a third passband distinct from the first and second passbands; and a fourth filter element configured to have a fourth passband distinct from the first, second, and third passbands.

Aspect 2: The apparatus of Aspect 1 comprising a multiband multiplexer that includes the first filter element, the second filter element, the third filter element, and the fourth filter element.

Aspect 3: The apparatus of Aspect 2, wherein the multiband multiplexer comprises a quadplexer that comprises the first filter element, the second filter element, the third filter element, and the fourth filter element.

Aspect 4: The apparatus of Aspect 3, wherein the quadplexer is configured to filter one or more signals transmitted and received over: the first predefined communication band defined by a first transmission frequency range and a first reception frequency range; the second predefined communication band defined by a second transmission frequency range and a second reception frequency range; a third predefined communication band defined by a third transmission frequency range and a third reception frequency range; a fourth predefined communication band defined by a fourth transmission frequency range and a fourth reception frequency range; a fifth predefined communication band defined by a fifth transmission frequency range and a fifth reception frequency range; and a sixth predefined communication band defined by a sixth transmission frequency range and a sixth reception frequency range; wherein frequency ranges for each of the first, second, third, fourth, fifth, and sixth predefined communication bands are distinct, and overlap at least a portion of a frequency range for another of the first, second, third, fourth, fifth, and sixth bands within the first passband, the second passband, the third passband, and the fourth passband.

Aspect 5: The apparatus of Aspect 4, wherein the first predefined communication band corresponds to long term evolution (LTE) defined band 1.

Aspect 6: The apparatus of any of Aspects 4 or 5, wherein the second predefined communication band corresponds to LTE defined band 3.

Aspect 7: The apparatus of any of Aspects 4-6, wherein the third predefined communication band corresponds to LTE defined band 4.

Aspect 8: The apparatus of any of Aspects 4-7, wherein the fourth predefined communication band corresponds to LTE defined band 23.

Aspect 9: The apparatus of any of Aspects 4-8, wherein the fifth predefined communication band corresponds to LTE defined band 65.

Aspect 10: The apparatus of any one Aspects 4-9, wherein the sixth predefined communication band corresponds to LTE defined band 66.

Aspect 11: The apparatus of any of Aspects 4-10, wherein the first transmission frequency range includes frequencies between 1920 megahertz (MHz) and 1980 MHz.

Aspect 12: The apparatus of any of Aspects 4-11, wherein the first reception frequency range includes frequencies between 2110 MHz and 2170 MHz.

Aspect 13: The apparatus of any of Aspects 4-12, wherein the second transmission frequency range includes frequencies between 1710 MHz and 1785 MHz.

Aspect 14: The apparatus of any of Aspects 4-13, wherein the second reception frequency range includes frequencies between 1805 MHz and 1880 MHz.

Aspect 15: The apparatus of any of Aspects 4-14, wherein the third transmission frequency range includes frequencies between 1710 MHz and 1755 MHz.

Aspect 16: The apparatus of any of Aspects 4-15, wherein the third reception frequency range includes frequencies between 2110 MHz and 2155 MHz.

Aspect 17: The apparatus of any of Aspects 4-16, wherein the fourth transmission frequency range includes frequencies between 2000 MHz and 2020 MHz.

Aspect 18: The apparatus of any of Aspects 4-17, wherein the fourth reception frequency range includes frequencies between 2180 MHz and 2200 MHz.

Aspect 19: The apparatus of any of Aspects 4-18, wherein the fifth transmission frequency range includes frequencies between 1920 MHz and 2010 MHz.

Aspect 20: The apparatus of any of Aspects 4-19, wherein the fifth reception frequency range includes frequencies between 2110 MHz and 2200 MHz.

Aspect 21: The apparatus of any of Aspects 4-20, wherein the sixth transmission frequency range includes frequencies between 1710 MHz and 1780 MHz.

Aspect 22: The apparatus of any of Aspects 4-21, wherein the sixth reception frequency range includes frequencies between 2110 MHz and 2200 MHz.

Aspect 23: The apparatus of Aspect 4, wherein the third transmission frequency range is higher in frequency than the first transmission frequency range and the second transmission frequency range.

Aspect 24: The apparatus of any of Aspects 4 or 23, wherein the second reception frequency range is higher in frequency than the first reception frequency range and the third reception frequency range.

Aspect 25: The apparatus of any of Aspects 1-24, wherein the first filter element, the second filter element, the third filter element, and the fourth filter element share a common port.

Aspect 26: The apparatus of any of Aspects 1-25, wherein the first filter element, the second filter element, the third filter element, and the fourth filter element form a portion of a quadplexer.

Aspect 27: The apparatus of any of Aspects 1-26, wherein the first passband is substantially adjacent to the second passband, with a narrow stopband between the first passband and the second passband.

Aspect 28: The apparatus of any of Aspects 1-27, wherein the third passband is substantially adjacent to the second passband, with a narrow stopband between the third passband and the second passband.

Aspect 29: The apparatus of any of Aspects 1-28, wherein the third passband is substantially adjacent to the second passband, with a narrow stopband between the third passband and the second passband.

Aspect 30: The apparatus of any of Aspects 1-29, wherein the third passband is substantially adjacent to the fourth passband, with a narrow stopband between the third passband and the fourth passband.

Aspect 31: The apparatus of any of Aspects 3-30 above, wherein the quadplexer comprises one or more phase shifting components electrically connected to at least one of the first filter element, the second filter element, the third filter element, the fourth filter element, or any combination thereof.

Aspect 32: The apparatus of Aspect 31, wherein the one or more phase shifting components are electrically connected between the common port and at least one of the first filter element, the second filter element, the third filter element, or the fourth filter element.

Aspect 33: The apparatus of any of Aspects 1-32, wherein the first filter element, the second filter element, the third filter element, and the fourth filter element form a plurality of filter circuits, the apparatus further comprising a power amplifier and a connection port configured to electrically connect to an antenna, wherein at least one of the plurality of filter circuits is selectively electrically connected between the power amplifier and the connection port.

Aspect 34: The apparatus of any of Aspects 1-33, wherein the first filter element, the second filter element, the third filter element, and the fourth filter element form a plurality of filter circuits, the apparatus further comprising one or more electronic switching components having at least one switching component electrically connected between the plurality of filter circuits and an antenna connection port configured to electrically connect to an antenna.

Aspect 35: The apparatus of any of Aspects 1-34, wherein the first filter element, the second filter element, the third filter element, and the fourth filter element form a plurality of filter circuits, the apparatus further comprising a transceiver circuit comprising the plurality of filter circuits.

Aspect 36: The apparatus of Aspect 35, wherein the transceiver circuit is configured to operate in a first carrier aggregation mode to transmit and receive the one or more signals over a combination of the first predefined communication band and the second predefined communication band in a frequency division duplexing mode.

Aspect 37: The apparatus of Aspect 36, wherein the transceiver circuit is further configured to operate in a second carrier aggregation mode to transmit and receive the one or more signals over a combination of the second predefined communication band and the third predefined communication band.

Aspect 38: The apparatus any of Aspects 1-37, wherein the first filter element, the second filter element, the third filter element, and the fourth filter element form a plurality of filter circuits, the apparatus further comprising one or more other filter circuits and a plurality of switching components, the plurality of switching components electrically connected between a node and both the plurality of filter circuits and the one or more other filter circuits.

Aspect 39: The apparatus of any of Aspects 1-38, wherein the first filter element, the second filter element, the third filter element, and the fourth filter element form a plurality of filter circuits, the apparatus further comprising a diplexer electrically connected between an antenna and the plurality of filter circuits.

Aspect 40: The apparatus of any of Aspects 1-39, wherein the first filter element, the second filter element, the third filter element, and the fourth filter element form a plurality of filter circuits, wherein the plurality of filter circuits comprises one or more acoustic wave resonators.

Aspect 41: The apparatus of any of Aspects 1-4, wherein the apparatus is configured to perform operations comprising performing carrier aggregation in a first carrier aggregation mode during a first time period to transmit and receive the one or more signals over a combination of the first predefined communication band and the second predefined communication band in a frequency division duplexing mode using the quadplexer.

Aspect 42: The apparatus of Aspect 41, wherein performing carrier aggregation in the first carrier aggregation mode includes simultaneously connecting a transmit path including a power amplifier to the first filter element of the quadplexer and connecting a plurality of receive paths including multiple low noise amplifiers to the third filter element and the fourth filter element of the quadplexer.

Aspect 43: The apparatus of Aspect 25, wherein a passband associated with the first filter element includes frequencies from 1710 MHz to 1785 MHz.

Aspect 44: The apparatus of any of Aspects 25 or 43, wherein a passband associated with the first filter element includes frequencies from 1810 MHz to 1880 MHz.

Aspect 45: The apparatus of any of Aspects 25 or 43-44, wherein a passband associated with the first filter element includes frequencies from 1920 MHz to 2020 MHz.

Aspect 46: The apparatus of any of Aspects 25 or 43-45, wherein a passband associated with the first filter element includes frequencies from 2010 MHz to 2100 MHz.

Aspect 47: A method for filtering one or more signals for wireless communications, the method comprising: filtering, via a quadplexer, the one or more signals transmitted and received over: a first predefined communication band defined by a first transmission frequency range and a first reception frequency range; a second predefined communication band defined by a second transmission frequency range and a second reception frequency range; a third predefined communication band defined by a third transmission frequency range and a third reception frequency range; a fourth predefined communication band defined by a fourth transmission frequency range and a fourth reception frequency range; a fifth predefined communication band defined by a fifth transmission frequency range and a fifth reception frequency range; and a sixth predefined communication band defined by a sixth transmission frequency range and a sixth reception frequency range; wherein frequency ranges for each of the first, second, third, fourth, fifth, and sixth bands are distinct, and overlap at least a portion of a frequency range for another of the first, second, third, fourth, fifth, and sixth bands.

Aspect 48: An apparatus for filtering one or more signals for wireless communications, the apparatus comprising: a plurality of filter circuits configured to filter the one or more signals transmitted and received over at least one of: a first predefined communication band defined by a first transmission frequency range and a first reception frequency range; a second predefined communication band defined by a second transmission frequency range and a second reception frequency range; a third predefined communication band defined by a third transmission frequency range and a third reception frequency range; and a fourth predefined communication band defined by a fourth transmission frequency range and a fourth reception frequency range, the plurality of filter circuits comprising: a first filter element configured to have a first passband that spans both the first transmission frequency range and the second transmission frequency range, the second transmission frequency range partially overlapping or adjacent to the first transmission frequency range; a second filter element having a second passband that spans the third transmission frequency range; a third filter element having a third passband that spans both the second reception frequency range and the third reception frequency range; and a fourth filter element having a fourth passband that spans the fourth reception frequency range.

Aspect 49: The apparatus of Aspect 48, wherein the second passband of the second filter element spans the fourth transmission frequency range.

Aspect 50: The apparatus of any of Aspects 47 to 48, wherein the first predefined communication band is B65, wherein the second predefined communication band is B23, wherein the third predefined communication band is B66, and wherein the fourth predefined communication band is B3.

Aspect 51: The apparatus of any of Aspects 47 to 49, wherein the third passband of the third filter element spans the first reception frequency range of the first predefined communication band.

Aspect 52: The apparatus of any of Aspects 47 to 50, wherein the plurality of filter circuits is configured to filter the one or more signals transmitted and received further over a fifth predefined communication band defined by a fifth transmission frequency range and a fifth reception frequency range, wherein the first passband of the first filter element spans the fifth transmission frequency range, wherein the third passband of the third filter spans the fifth reception frequency range.

Aspect 53: The apparatus of Aspect 52, wherein the fifth predefined communication band is B1.

Aspect 54: The apparatus of any one of Aspects 52 or 53, wherein the fifth predefined communication band is B4.

Aspect 55: The apparatus of any of Aspects 47 to 54, wherein the first passband is defined between 1920 MHz and 2020 MHz, wherein the second passband is defined between 1710 MHz and 1785 MHz, wherein the third passband is defined between 2110 MHz and 2200 MHz, and wherein the fourth passband is defined between 1800 MHz and 1880 MHz.

Aspect 56: The apparatus of any of Aspects 47 to 55, wherein the first transmission frequency range includes frequencies between 1920 MHz and 2010 MHz, wherein the first reception frequency range includes frequencies between 2110 MHz and 2200 MHz, wherein the second transmission frequency range includes frequencies between 2000 MHz and 2020 MHz, wherein the second reception frequency range includes frequencies between 2180 MHz and 2200 MHz, wherein the third transmission frequency range includes frequencies between 1710 MHz and 1780 MHz, wherein the third reception frequency range includes frequencies between 2110 MHz and 2200 MHz, wherein the fourth transmission frequency range includes frequencies between 1710 MHz and 1785 MHz, wherein the fourth reception frequency range includes frequencies between 1800 MHz and 1880 MHz.

Aspect 57: A multiplexer comprising at least four filters including: a first filter having a first passband extending from 1710 MHz to 1785 MHz; a second filter having a second passband extending from 1800 MHz to 1880 MHz; a third filter having a third passband extending from 1920 MHz to 2020 MHz; and a fourth filter having a fourth passband extending from 2110 MHz to 2200 MHz, each of the four filters coupled to a common port, the common port coupled between an antenna and the at least four filters.

Aspect 58: The apparatus of Aspect 57, wherein at least three of the first passband, the second passband, the third passband, and the fourth passband spans receive or transmit frequency ranges of at least two predefined communication bands.

Aspect 59: The apparatus of Aspect 58, wherein the at least two predefined communication bands include overlapping frequencies.

Aspect 60: The apparatus of Aspect 57, wherein the first passband spans transmit frequency ranges of at least three predefined communication bands, wherein the third passband spans transmit frequency ranges of at least three predefined communication bands, wherein the fourth passband spans receive frequency ranges of at least 4 predefined communication bands.

Aspect 61: The apparatus of any one of Aspects 57 to 60, further comprising a power amplifier and a connection port configured to electrically connect to an antenna, wherein at least one of four filters is selectively electrically connected between the power amplifier and the connection port.

Aspect 62: The apparatus of any one of Aspects 57 to 61, further comprising one or more electronic switching components having at least one switching component electrically connected between the four filters and an antenna connection port configured to electrically connect to an antenna.

Aspect 63. An apparatus for filtering one or more signals for wireless communications, the apparatus comprising: a plurality of filter circuits configured to filter the one or more signals transmitted and received over at least one of: a first predefined communication band defined by a first transmission frequency range and a first reception frequency range; a second predefined communication band defined by a second transmission frequency range and a second reception frequency range; a third predefined communication band defined by a third transmission frequency range and a third reception frequency range; and a fourth predefined communication band defined by a fourth transmission frequency range and a fourth reception frequency range, the plurality of filter circuits comprising: a first filter element configured to have a first passband that spans both the first transmission frequency range and the second transmission frequency range, the second transmission frequency range partially overlapping or adjacent to the first transmission frequency range; a second filter element having a second passband that spans the third transmission frequency range; a third filter element having a third passband that spans both the second reception frequency range and the third reception frequency range; and a fourth filter element having a fourth passband that spans the fourth reception frequency range.

Aspect 64. The apparatus of Aspect 63, wherein the second passband of the second filter element spans the fourth transmission frequency range; and wherein the third passband of the third filter element spans the first reception frequency range of the first predefined communication band.

Aspect 65. The apparatus of any of Aspects 63 to 64, wherein the first predefined communication band is B65, wherein the second predefined communication band is B23, wherein the third predefined communication band is B66, and wherein the fourth predefined communication band is B3.

Aspect 66. The apparatus of any of Aspects 63 to 65, wherein the plurality of filter circuits is configured to filter the one or more signals transmitted and received further over a fifth predefined communication band defined by a fifth transmission frequency range and a fifth reception frequency range, wherein the first passband of the first filter element spans the fifth transmission frequency range, wherein the third passband of the third filter element spans the fifth reception frequency range.

Aspect 67. The apparatus of any of Aspects 63 to 66, wherein the fifth predefined communication band is B1; and wherein the fifth predefined communication band is B4.

Aspect 68. The apparatus of any of Aspects 63 to 67, wherein the first passband is defined between 1920 MHz and 2020 MHz, wherein the second passband is defined between 1710 MHz and 1785 MHz, wherein the third passband is defined between 2110 MHz and 2200 MHz, and wherein the fourth passband is defined between 1800 MHz and 1880 MHz.

Aspect 69. A multiplexer comprising at least four filters including: a first filter having a first passband extending from 1710 MHz to 1785 MHz; a second filter having a second passband extending from 1800 MHz to 1880 MHz; a third filter having a third passband extending from 1920 MHz to 2020 MHz; and a fourth filter having a fourth passband extending from 2110 MHz to 2200 MHz, each filter coupled to a common port, the common port coupled between an antenna and the at least four filters.

Aspect 70. The multiplexer of Aspect 69, wherein the first passband spans transmit frequency ranges of at least three predefined communication bands, wherein the third passband spans transmit frequency ranges of at least three predefined communication bands, wherein the fourth passband spans receive frequency ranges of at least 4 predefined communication bands.

Aspect 71: A system includes a storage (implemented in circuitry) configured to store instructions and a processor. The processor configured to execute the instructions and cause the processor to: a multiband multiplexer that includes a first filter element, a second filter element, a third filter element, and a fourth filter element: wherein the first filter element configured to have a first passband that spans a first predefined frequency range of a first communication band and a second predefined frequency range of a second communication band, wherein the first predefined frequency range overlaps a portion of the second predefined frequency range; wherein the second filter element configured to have a second passband distinct from the first passband; wherein the third filter element configured to have a third passband distinct from the first and second passbands; wherein the fourth filter element configured to have a fourth passband distinct from the first, second, and third passbands; and wherein the first filter element, the second filter element, the third filter element, and.

Aspect 72: The system of Aspect 71, wherein the multiplexer is a quadplexer that is configured to filter signals transmitted and received over: the first communication band defined by a first transmission frequency range and a first reception frequency range; the second communication band defined by a second transmission frequency range and a second reception frequency range; a third communication band defined by a third transmission frequency range and a third reception frequency range; a fourth communication band defined by a fourth transmission frequency range and a fourth reception frequency range; a fifth communication band defined by a fifth transmission frequency range and a fifth reception frequency range; and a sixth communication band defined by a sixth transmission frequency range and a sixth reception frequency range; wherein frequency ranges for each of the first, second, third, fourth, fifth, and sixth communication bands are distinct, and overlap at least a portion of a frequency range for another of the first, second, third, fourth, fifth, and sixth communication bands within the first passband, the second passband, the third passband, and the fourth passband.

Aspect 73: The system of any of Aspects 71 to 72, wherein the first communication band corresponds to long term evolution (LTE) defined band 1; wherein the second communication band corresponds to LTE defined band 3; wherein the third communication band corresponds to LTE defined band 4; wherein the fourth communication band corresponds to LTE defined band 23; wherein the fifth communication band corresponds to LTE defined band 65; and wherein the sixth communication band corresponds to LTE defined band 66.

Aspect 74: The system of any of Aspects 71 to 73, wherein the first transmission frequency range includes frequencies between 1920 megahertz (MHz) and 1980 MHz.

Aspect 75: The system of any of Aspects 71 to 74, wherein the second transmission frequency range includes frequencies between 1710 MHz and 1785 MHz.

Aspect 76: The system of any of Aspects 71 to 75, wherein the second reception frequency range includes frequencies between 1805 MHz and 1880 MHz; wherein the third transmission frequency range includes frequencies between 1710 MHz and 1755 MHz.

Aspect 77: The system of any of Aspects 71 to 76, wherein the third transmission frequency range is higher in frequency than the first transmission frequency range and the second transmission frequency range.

Aspect 78: The system of any of Aspects 71 to 77, wherein the second reception frequency range is higher in frequency than the first reception frequency range and the third reception frequency range.

Aspect 79: The system of any of Aspects 71 to 78, wherein the quadplexer comprises one or more phase shifting components electrically connected to at least one of the first filter element, the second filter element, the third filter element, the fourth filter element, or any combination thereof.

Aspect 80: The system of any of Aspects 71 to 79, wherein the one or more phase shifting components are electrically connected between a common port and at least one of the first filter element, the second filter element, the third filter element, or the fourth filter element.

Aspect 81: The system of any of Aspects 71 to 80, wherein the first filter element, the second filter element, the third filter element, and the fourth filter element form a portion of a quadplexer.

Aspect 82: The system of any of Aspects 71 to 81, wherein the first passband is substantially adjacent to the second passband, with a narrow stopband between the first passband and the second passband.

Aspect 83: The system of any of Aspects 71 to 82, wherein the third passband is substantially adjacent to the second passband, with a narrow stopband between the third passband and the second passband.

Aspect 84: The system of any of Aspects 71 to 83, wherein the third passband is substantially adjacent to the fourth passband, with a narrow stopband between the third passband and the fourth passband.

Aspect 85: The system of any of Aspects 71 to 84, wherein the first filter element, the second filter element, the third filter element, and the fourth filter element form a plurality of filter circuits, wherein at least one of the plurality of filter circuits is selectively electrically connected between the power amplifier and the connection port.

Aspect 86: The system of any of Aspects 71 to 85, wherein the first filter element, the second filter element, the third filter element, and the fourth filter element form a plurality of filter circuits.

Aspect 87: The system of any of Aspects 71 to 86, wherein the first filter element, the second filter element, the third filter element, and the fourth filter element form a plurality of filter circuits.

Aspect 88: The system of any of Aspects 71 to 87, wherein the transceiver circuit is configured to operate in a first carrier aggregation mode to transmit and receive the one or more signals over a combination of the first communication band and the second communication band in a frequency division duplexing mode.

Aspect 89: The system of any of Aspects 71 to 88, wherein the transceiver circuit is further configured to operate in a second carrier aggregation mode to transmit and receive the one or more signals over a combination of the second communication band and the third communication band.

Aspect 90: The system of any of Aspects 71 to 89, wherein the first filter element, the second filter element, the third filter element, and the fourth filter element form a plurality of filter circuits, the plurality of switching components electrically connected between a node and both the plurality of filter circuits and the one or more other filter circuits.

Aspect 91: The system of any of Aspects 71 to 90, wherein the first filter element, the second filter element, the third filter element, and the fourth filter element form a plurality of filter circuits, wherein the plurality of filter circuits comprises one or more acoustic wave resonators.

Aspect 92: The system of any of Aspects 71 to 91, wherein the first predefined frequency range is a transmit portion of the first communication band, and wherein the second predefined frequency range is a transmit portion of the second communication band.

Aspect 93: The system of any of Aspects 71 to 92, wherein the first predefined frequency range is a receive portion of the first communication band, and wherein the second predefined frequency range is a receive portion of the second communication band.

Aspect 94. A method for filtering one or more signals for wireless communications, the method comprising: filtering, via a quadplexer, the one or more signals transmitted and received over: a first predefined communication band defined by a first transmission frequency range and a first reception frequency range; a second predefined communication band defined by a second transmission frequency range and a second reception frequency range; a third predefined communication band defined by a third transmission frequency range and a third reception frequency range; a fourth predefined communication band defined by a fourth transmission frequency range and a fourth reception frequency range; a fifth predefined communication band defined by a fifth transmission frequency range and a fifth reception frequency range; and a sixth predefined communication band defined by a sixth transmission frequency range and a sixth reception frequency range; wherein frequency ranges for each of the first, second, third, fourth, fifth, and sixth predefined communication bands are distinct, and overlap at least a portion of a frequency range for another of the first, second, third, fourth, fifth, and sixth predefined communication bands.

Aspect 95: An apparatus comprising means for performing any operation of any aspect above.

What is claimed is:

1. An apparatus for filtering one or more signals for wireless communications, the apparatus comprising:
    a multiband multiplexer that includes a first filter element, a second filter element, a third filter element, and a fourth filter element:
    wherein the first filter element is configured to have a first passband that spans a first predefined transmission frequency range of a first communication band, a second predefined transmission frequency range of a second communication band, and a third predefined transmission frequency range of a third communication band, wherein the first predefined transmission frequency range overlaps a portion of the second predefined transmission frequency range;
    wherein the second filter element is configured to have a second passband that spans a first predefined reception frequency range of the first communication band, the second passband being distinct from the first passband;
    wherein the third filter element is configured to have a third passband that spans a fourth predefined transmission frequency range of a fourth communication band, a fifth predefined transmission frequency range of a fifth communication band, and a sixth predefined transmission frequency range of a sixth communication band, the third passband being distinct from the first and second passbands;

wherein the fourth filter element is configured to have a fourth passband that spans a second predefined reception frequency range of the second communication band, the fourth passband being distinct from the first, second, and third passbands; and wherein the first filter element, the second filter element, the third filter element, and the fourth filter element share a common port.

2. The apparatus of claim 1, wherein the multiband multiplexer is a quadplexer that is configured to filter signals transmitted and received over:

the first communication band defined by the first transmission frequency range and the first reception frequency range;

the second communication band defined by the second transmission frequency range and the second reception frequency range;

the third communication band defined by the third transmission frequency range and a third reception frequency range;

the fourth communication band defined by the fourth transmission frequency range and a fourth reception frequency range;

the fifth communication band defined by the fifth transmission frequency range and a fifth reception frequency range; and the sixth communication band defined by the sixth transmission frequency range and a sixth reception frequency range;

wherein frequency ranges for each of the first, second, third, fourth, fifth, and sixth communication bands are distinct, and overlap at least a portion of a frequency range for another of the first, second, third, fourth, fifth, and sixth communication bands within the first passband, the second passband, the third passband, and the fourth passband.

3. The apparatus of claim 1, wherein the first communication band corresponds to long term evolution (LTE) defined band 66;

wherein the second communication band corresponds to LTE defined band 3;

wherein the third communication band corresponds to LTE defined band 4;

wherein the fourth communication band corresponds to LTE defined band 23;

wherein the fifth communication band corresponds to LTE defined band 65; and wherein the sixth communication band corresponds to LTE defined band 1.

4. The apparatus of claim 1, wherein the first transmission frequency range includes frequencies between 1710 megahertz (MHz) and 1780 MHz.

5. The apparatus of claim 1, wherein the second transmission frequency range includes frequencies between 1710 MHz and 1785 MHz.

6. The apparatus of claim 1, wherein the second reception frequency range includes frequencies between 1805 MHz and 1880 MHz;

wherein the third transmission frequency range includes frequencies between 1710 MHz and 1755 MHz.

7. The apparatus of claim 1, wherein the fourth transmission frequency range is higher in frequency than the first transmission frequency range and the second transmission frequency range.

8. The apparatus of claim 7, wherein the second reception frequency range is lower in frequency than the first reception frequency range and the third reception frequency range.

9. The apparatus of claim 1, wherein the first filter element, the second filter element, the third filter element, and the fourth filter element form a portion of a quadplexer.

10. The apparatus of claim 1, wherein the first passband is substantially adjacent to the second passband, with a narrow stopband between the first passband and the second passband.

11. The apparatus of claim 1, wherein the third passband is substantially adjacent to the second passband, with a narrow stopband between the third passband and the second passband.

12. The apparatus of claim 1, wherein the third passband is substantially adjacent to the fourth passband, with a narrow stopband between the third passband and the fourth passband.

13. The apparatus of claim 1, wherein the multiband multiplexer comprises one or more phase shifting components electrically connected to at least one of the first filter element, the second filter element, the third filter element, the fourth filter element, or any combination thereof.

14. The apparatus of claim 13, wherein the one or more phase shifting components are electrically connected between the common port and at least one of the first filter element, the second filter element, the third filter element, or the fourth filter element.

15. The apparatus of claim 1, wherein the first filter element, the second filter element, the third filter element, and the fourth filter element form a plurality of filter circuits, the apparatus further comprising a power amplifier and a connection port configured to electrically couple to an antenna, wherein at least one of the plurality of filter circuits is selectively electrically coupled between the power amplifier and the connection port.

16. The apparatus of claim 1, wherein the first filter element, the second filter element, the third filter element, and the fourth filter element form a plurality of filter circuits, the apparatus further comprising one or more electronic switching components having at least one switching component electrically connected between the plurality of filter circuits and an antenna connection port configured to electrically connect to an antenna.

17. The apparatus of claim 1, wherein the first filter element, the second filter element, the third filter element, and the fourth filter element form a plurality of filter circuits, the apparatus further comprising a transceiver circuit comprising the plurality of filter circuits.

18. The apparatus of claim 17, wherein the transceiver circuit is configured to operate in a first carrier aggregation mode to transmit and receive the one or more signals over a combination of the first communication band and the second communication band in a frequency division duplexing mode.

19. The apparatus of claim 18, wherein the transceiver circuit is further configured to operate in a second carrier aggregation mode to transmit and receive the one or more signals over a combination of the second communication band and the third communication band.

20. The apparatus of claim 1, wherein the first filter element, the second filter element, the third filter element, and the fourth filter element form a plurality of filter circuits, the apparatus further comprising one or more other filter circuits and a plurality of switching components, the plurality of switching components electrically connected between a node and both the plurality of filter circuits and the one or more other filter circuits.

21. The apparatus of claim 1, wherein the first filter element, the second filter element, the third filter element, and the fourth filter element form a plurality of filter circuits, wherein the plurality of filter circuits comprises one or more acoustic wave resonators.

22. A method for filtering a plurality of signals for wireless communications, the method comprising:
  receiving, at a carrier aggregation (CA) port, the plurality of signals; and
  filtering, via a quadplexer, the plurality of signals transmitted and received over:
    a first communication band defined by a first transmission frequency range and a first reception frequency range;
    a second communication band defined by a second transmission frequency range and a second reception frequency range;
    a third communication band defined by a third transmission frequency range and a third reception frequency range;
    a fourth communication band defined by a fourth transmission frequency range and a fourth reception frequency range;
    a fifth communication band defined by a fifth transmission frequency range and a fifth reception frequency range; and
    a sixth communication band defined by a sixth transmission frequency range and a sixth reception frequency range;
  wherein a first filter element of the quadplexer filters the first transmission frequency range, the second transmission frequency range, and the third transmission frequency range, a second filter element of the quadplexer filters the first reception frequency range, a third filter element of the quadplexer filters the fourth transmission frequency range, the fifth transmission frequency range, and the sixth transmission frequency range, and a fourth filter element of the quadplexer filters the second reception frequency range, and wherein frequency ranges for each of the first, second, third, fourth, fifth, and sixth communication bands are distinct, and overlap at least a portion of a frequency range for another of the first, second, third, fourth, fifth, and sixth communication bands.

23. The method of claim 22, wherein the first communication band corresponds to long term evolution (LTE) defined band 66;
  wherein the second communication band corresponds to LTE defined band 3;
  wherein the third communication band corresponds to LTE defined band 4;
  wherein the fourth communication band corresponds to LTE defined band 23;
  wherein the fifth communication band corresponds to LTE defined band 65; and
  wherein the sixth communication band corresponds to LTE defined band 1.

24. The method of claim 22, wherein the first transmission frequency range includes frequencies between 1710 megahertz (MHz) and 1780 MHz.

25. The method of claim 22, wherein the second transmission frequency range includes frequencies between 1710 MHz and 1785 MHz.

26. The method of claim 22, wherein the second reception frequency range includes frequencies between 1805 MHz and 1880 MHz;
  wherein the third transmission frequency range includes frequencies between 1710 MHz and 1755 MHz.

27. The method of claim 22, wherein the fourth transmission frequency range is higher in frequency than the first transmission frequency range and the second transmission frequency range.

28. The method of claim 27, wherein the second reception frequency range is lower in frequency than the first reception frequency range and the third reception frequency range.

* * * * *